United States Patent
Watson et al.

(10) Patent No.: US 8,958,375 B2
(45) Date of Patent: Feb. 17, 2015

(54) FRAMING FOR AN IMPROVED RADIO LINK PROTOCOL INCLUDING FEC

(75) Inventors: Mark Watson, San Francisco, CA (US); Ramin Rezaiifar, San Diego, CA (US); Lorenzo Vicisano, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 13/025,925

(22) Filed: Feb. 11, 2011

(65) Prior Publication Data

US 2012/0207068 A1  Aug. 16, 2012

(51) Int. Cl.
| | |
|---|---|
| H04W 4/00 | (2009.01) |
| H04J 3/24 | (2006.01) |
| H04J 3/00 | (2006.01) |
| H04L 1/00 | (2006.01) |
| H04W 28/06 | (2009.01) |

(52) U.S. Cl.
CPC ............ *H04L 1/0083* (2013.01); *H04W 28/06* (2013.01)
USPC ............ 370/329; 370/338; 370/473; 370/476

(58) Field of Classification Search
USPC .............. 370/229–251, 310–350, 464–492, 370/503–529; 455/46–47, 72, 446–466, 455/500–703
See application file for complete search history.

(56) References Cited

U.S. PATENT DOCUMENTS

| | | | |
|---|---|---|---|
| 3,909,721 A | 9/1975 | Bussgang et al. | |
| 4,365,338 A | 12/1982 | McRae et al. | |
| 4,589,112 A | 5/1986 | Karim | |
| 4,901,319 A | 2/1990 | Ross | |
| 5,136,592 A | 8/1992 | Weng | |
| 5,153,591 A | 10/1992 | Clark | |
| 5,329,369 A | 7/1994 | Willis et al. | |
| 5,331,320 A | 7/1994 | Cideciyan et al. | |

(Continued)

FOREIGN PATENT DOCUMENTS

| | | |
|---|---|---|
| CN | 1338839 A | 3/2002 |
| CN | 1425228 A | 6/2003 |

(Continued)

OTHER PUBLICATIONS

3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.

(Continued)

*Primary Examiner* — Tri H Phan
(74) *Attorney, Agent, or Firm* — Jeffrey Jacobs

(57) ABSTRACT

Framing techniques for an improved radio link protocol used in a wireless communication system, such as EV-DO. In one embodiment scheduling of the generation of repair symbols encoded to be transmitted along with source data is described. In another embodiment acknowledgment messages from a receiver are used to control the trailing edge of the protection window offered by the repair symbols. In another embodiment, non-acknowledgment messages from a receiver are used to control the generation of extra repair symbols. In another embodiment, a length field is used to avoid transmission of padding bytes over the air. In yet another embodiment, a symbol auxiliary field is appended to source symbols to indicate the padding bytes needed for symbol aligning thus avoiding the transmission of padding bytes over the air.

11 Claims, 18 Drawing Sheets

(56) References Cited

U.S. PATENT DOCUMENTS

| | | | |
|---|---|---|---|
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,699,473 A | 12/1997 | Kim |
| 5,701,582 A | 12/1997 | DeBey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,852,565 A | 12/1998 | Demos |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 * | 5/2001 | Cheng et al. ............. 370/474 |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,497,479 B1 | 12/2002 | Stoffel et al. |
| 6,510,177 B1 | 1/2003 | De Bonet et al. |
| 6,523,147 B1 | 2/2003 | Kroeger et al. |
| 6,535,920 B1 | 3/2003 | Parry et al. |
| 6,577,599 B1 | 6/2003 | Gupta et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,641,366 B2 | 11/2003 | Nordhoff |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 | 7/2004 | Wyatt |
| 6,804,202 B1 * | 10/2004 | Hwang ............. 370/282 |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,856,263 B2 | 2/2005 | Shokrollahi et al. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,937,618 B1 | 8/2005 | Noda et al. |
| 6,956,875 B2 | 10/2005 | Kapadia et al. |
| 6,965,636 B1 | 11/2005 | DesJardins et al. |
| 6,985,459 B2 * | 1/2006 | Dickson ............ 370/328 |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 * | 4/2006 | Lu et al. ............ 370/235 |
| 7,057,534 B2 | 6/2006 | Luby |
| 7,068,681 B2 * | 6/2006 | Chang et al. ........ 370/474 |
| 7,068,729 B2 | 6/2006 | Shokrollahi et al. |
| 7,072,971 B2 | 7/2006 | Lassen et al. |
| 7,073,191 B2 | 7/2006 | Srikantan et al. |
| 7,100,188 B2 | 8/2006 | Hejna et al. |
| 7,110,412 B2 | 9/2006 | Costa et al. |
| 7,139,660 B2 | 11/2006 | Sarkar et al. |
| 7,139,960 B2 | 11/2006 | Shokrollahi |
| 7,143,433 B1 | 11/2006 | Duan et al. |
| 7,151,754 B1 * | 12/2006 | Boyce et al. ........ 370/328 |
| 7,154,951 B2 | 12/2006 | Wang |
| 7,164,370 B1 | 1/2007 | Mishra |
| 7,164,882 B2 | 1/2007 | Poltorak |
| 7,168,030 B2 | 1/2007 | Ariyoshi |
| 7,219,289 B2 | 5/2007 | Dickson |
| 7,231,404 B2 | 6/2007 | Paila et al. |
| 7,233,264 B2 | 6/2007 | Luby |
| 7,240,236 B2 | 7/2007 | Cutts et al. |
| 7,240,358 B2 | 7/2007 | Horn et al. |

(56) References Cited

U.S. PATENT DOCUMENTS

| | | |
|---|---|---|
| 7,243,285 B2 | 7/2007 | Foisy et al. |
| 7,249,291 B2 | 7/2007 | Rasmussen et al. |
| 7,254,754 B2 | 8/2007 | Hetzler et al. |
| 7,257,764 B2 | 8/2007 | Suzuki et al. |
| 7,265,688 B2 | 9/2007 | Shokrollahi et al. |
| 7,293,222 B2 | 11/2007 | Shokrollahi et al. |
| 7,295,573 B2 * | 11/2007 | Yi et al. .................... 370/469 |
| 7,304,990 B2 | 12/2007 | Rajwan |
| 7,318,180 B2 | 1/2008 | Starr |
| 7,320,099 B2 | 1/2008 | Miura et al. |
| 7,363,048 B2 * | 4/2008 | Cheng et al. .................. 455/517 |
| 7,391,717 B2 | 6/2008 | Klemets et al. |
| 7,394,407 B2 | 7/2008 | Shokrollahi et al. |
| 7,398,454 B2 | 7/2008 | Cai et al. |
| 7,409,626 B1 | 8/2008 | Schelstraete |
| 7,412,641 B2 | 8/2008 | Shokrollahi |
| 7,418,651 B2 | 8/2008 | Luby et al. |
| 7,451,377 B2 | 11/2008 | Shokrollahi |
| 7,483,447 B2 * | 1/2009 | Chang et al. ................... 370/469 |
| 7,483,489 B2 | 1/2009 | Gentric et al. |
| 7,512,697 B2 | 3/2009 | Lassen et al. |
| 7,525,994 B2 | 4/2009 | Scholte |
| 7,529,806 B1 | 5/2009 | Shteyn |
| 7,532,132 B2 | 5/2009 | Shokrollahi et al. |
| 7,555,006 B2 | 6/2009 | Wolfe et al. |
| 7,559,004 B1 | 7/2009 | Chang et al. |
| 7,570,665 B2 | 8/2009 | Ertel et al. |
| 7,590,118 B2 | 9/2009 | Giesberts et al. |
| 7,597,423 B2 | 10/2009 | Silverbrook |
| 7,613,183 B1 | 11/2009 | Brewer et al. |
| 7,633,413 B2 | 12/2009 | Shokrollahi et al. |
| 7,633,970 B2 | 12/2009 | van Kampen et al. |
| 7,644,335 B2 | 1/2010 | Luby et al. |
| 7,650,036 B2 | 1/2010 | Lei et al. |
| 7,668,198 B2 * | 2/2010 | Yi et al. .................... 370/466 |
| 7,676,735 B2 | 3/2010 | Luby et al. |
| 7,711,068 B2 | 5/2010 | Shokrollahi et al. |
| 7,720,096 B2 | 5/2010 | Klemets |
| 7,720,174 B2 | 5/2010 | Shokrollahi et al. |
| 7,721,184 B2 | 5/2010 | Luby et al. |
| 7,812,743 B2 | 10/2010 | Luby |
| 7,831,896 B2 | 11/2010 | Amram et al. |
| 7,924,913 B2 | 4/2011 | Sullivan et al. |
| 7,956,772 B2 | 6/2011 | Shokrollahi et al. |
| 7,961,700 B2 | 6/2011 | Malladi et al. |
| 7,971,129 B2 | 6/2011 | Watson et al. |
| 7,979,769 B2 | 7/2011 | Lee et al. |
| 8,027,328 B2 * | 9/2011 | Yang et al. .................... 370/349 |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,340,133 B2 | 12/2012 | Kim et al. |
| 8,422,474 B2 * | 4/2013 | Park et al. .................... 370/338 |
| 8,462,643 B2 * | 6/2013 | Walton et al. ................ 370/252 |
| 8,544,043 B2 | 9/2013 | Parekh et al. |
| 8,615,023 B2 * | 12/2013 | Oh et al. .................... 370/474 |
| 8,638,796 B2 | 1/2014 | Dan et al. |
| 8,737,421 B2 * | 5/2014 | Zhang et al. .................. 370/437 |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0053062 A1 | 5/2002 | Szymanski |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0037299 A1 | 2/2003 | Smith |
| 2003/0086515 A1 | 5/2003 | Trans et al. |
| 2003/0101408 A1 | 5/2003 | Martinian et al. |
| 2003/0106014 A1 | 6/2003 | Dohmen et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0151109 A1 | 8/2004 | Batra et al. |
| 2004/0207548 A1 | 10/2004 | Kilbank |
| 2004/0240382 A1 | 12/2004 | Ido et al. |
| 2004/0255328 A1 | 12/2004 | Baldwin et al. |
| 2005/0018635 A1 | 1/2005 | Proctor |
| 2005/0028067 A1 | 2/2005 | Weirauch |
| 2005/0041736 A1 | 2/2005 | Butler-Smith et al. |
| 2005/0084006 A1 | 4/2005 | Lei et al. |
| 2005/0091697 A1 | 4/2005 | Tanaka et al. |
| 2005/0097213 A1 | 5/2005 | Barrett et al. |
| 2005/0123058 A1 | 6/2005 | Greenbaum et al. |
| 2005/0138286 A1 | 6/2005 | Franklin et al. |
| 2005/0163468 A1 | 7/2005 | Takahashi et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0195899 A1 | 9/2005 | Han |
| 2005/0195900 A1 | 9/2005 | Han |
| 2005/0207392 A1 * | 9/2005 | Sivalingham et al. ........ 370/349 |
| 2005/0216472 A1 | 9/2005 | Leon et al. |
| 2005/0254575 A1 | 11/2005 | Hannuksela et al. |
| 2006/0015568 A1 | 1/2006 | Walsh et al. |
| 2006/0020796 A1 | 1/2006 | Aura et al. |
| 2006/0031738 A1 | 2/2006 | Fay et al. |
| 2006/0037057 A1 | 2/2006 | Xu |
| 2006/0093634 A1 | 5/2006 | Lutz et al. |
| 2006/0107174 A1 | 5/2006 | Heise |
| 2006/0109805 A1 | 5/2006 | Malamal Vadakital et al. |
| 2006/0120464 A1 | 6/2006 | Hannuksela |
| 2006/0193524 A1 | 8/2006 | Tarumoto et al. |
| 2006/0212444 A1 | 9/2006 | Handman et al. |
| 2006/0212782 A1 | 9/2006 | Li |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2006/0279437 A1 | 12/2006 | Luby et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0028099 A1 | 2/2007 | Entin et al. |
| 2007/0078876 A1 | 4/2007 | Hayashi et al. |
| 2007/0081562 A1 | 4/2007 | Ma |
| 2007/0110074 A1 | 5/2007 | Bradley et al. |
| 2007/0140369 A1 | 6/2007 | Limberg et al. |
| 2007/0162568 A1 | 7/2007 | Gupta et al. |
| 2007/0162611 A1 | 7/2007 | Yu et al. |
| 2007/0176800 A1 | 8/2007 | Rijavec |
| 2007/0185973 A1 | 8/2007 | Wayda et al. |
| 2007/0195894 A1 | 8/2007 | Shokrollahi et al. |
| 2007/0201549 A1 | 8/2007 | Hannuksela et al. |
| 2007/0204196 A1 | 8/2007 | Watson et al. |
| 2007/0230568 A1 | 10/2007 | Eleftheriadis et al. |
| 2007/0233784 A1 | 10/2007 | Orourke et al. |
| 2007/0255844 A1 | 11/2007 | Shen et al. |
| 2007/0277209 A1 | 11/2007 | Yousef |
| 2007/0300127 A1 | 12/2007 | Watson et al. |
| 2008/0034273 A1 | 2/2008 | Luby |
| 2008/0052753 A1 | 2/2008 | Huang et al. |
| 2008/0058958 A1 | 3/2008 | Cheng |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |

(56) References Cited

U.S. PATENT DOCUMENTS

| | | |
|---|---|---|
| 2008/0152241 A1 | 6/2008 | Itoi et al. |
| 2008/0170564 A1 | 7/2008 | Shi et al. |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0215317 A1 | 9/2008 | Fejzo |
| 2008/0232357 A1 | 9/2008 | Chen |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0303896 A1 | 12/2008 | Lipton et al. |
| 2008/0309525 A1 | 12/2008 | Shokrollahi et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0031199 A1 | 1/2009 | Luby et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1* | 4/2009 | Joo et al. ................... 370/392 |
| 2009/0100496 A1 | 4/2009 | Bechtolsheim et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0158114 A1 | 6/2009 | Shokrollahi |
| 2009/0164653 A1 | 6/2009 | Mandyam et al. |
| 2009/0189792 A1 | 7/2009 | Shokrollahi et al. |
| 2009/0195640 A1 | 8/2009 | Kim et al. |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0307565 A1 | 12/2009 | Luby et al. |
| 2009/0319563 A1 | 12/2009 | Schnell |
| 2009/0328228 A1 | 12/2009 | Schnell |
| 2010/0011274 A1 | 1/2010 | Stockhammer et al. |
| 2010/0020871 A1 | 1/2010 | Hannuksela et al. |
| 2010/0023525 A1 | 1/2010 | Westerlund et al. |
| 2010/0046906 A1 | 2/2010 | Kanamori et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0103001 A1 | 4/2010 | Shokrollahi et al. |
| 2010/0131671 A1 | 5/2010 | Kohli et al. |
| 2010/0153578 A1 | 6/2010 | Van Gassel et al. |
| 2010/0165077 A1 | 7/2010 | Yin et al. |
| 2010/0174823 A1 | 7/2010 | Huang |
| 2010/0189131 A1 | 7/2010 | Branam et al. |
| 2010/0211690 A1 | 8/2010 | Pakzad et al. |
| 2010/0223533 A1 | 9/2010 | Stockhammer et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0019769 A1 | 1/2011 | Shokrollahi et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0103519 A1 | 5/2011 | Shokrollahi et al. |
| 2011/0119394 A1 | 5/2011 | Wang et al. |
| 2011/0119396 A1 | 5/2011 | Kwon et al. |
| 2011/0216541 A1 | 9/2011 | Inoue et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0258510 A1 | 10/2011 | Watson et al. |
| 2011/0268178 A1 | 11/2011 | Park et al. |
| 2011/0280311 A1 | 11/2011 | Chen et al. |
| 2011/0280316 A1 | 11/2011 | Chen et al. |
| 2011/0299629 A1 | 12/2011 | Luby et al. |
| 2011/0307545 A1 | 12/2011 | Bouazizi |
| 2012/0013746 A1 | 1/2012 | Chen |
| 2012/0016965 A1 | 1/2012 | Chen |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0099593 A1 | 4/2012 | Luby |
| 2012/0151302 A1 | 6/2012 | Luby et al. |
| 2012/0202535 A1 | 8/2012 | Chaddha et al. |
| 2012/0208580 A1* | 8/2012 | Luby et al. .................... 455/509 |
| 2012/0210190 A1 | 8/2012 | Luby et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby et al. |
| 2013/0287023 A1* | 10/2013 | Bims ............................ 370/389 |
| 2014/0009578 A1 | 1/2014 | Chen et al. |

FOREIGN PATENT DOCUMENTS

| | | |
|---|---|---|
| CN | 1481643 A | 3/2004 |
| CN | 1708934 A | 12/2005 |
| CN | 1714577 A | 12/2005 |
| CN | 1792056 A | 6/2006 |
| CN | 1806392 A | 7/2006 |
| CN | 1868157 A | 11/2006 |
| CN | 101390399 A | 3/2009 |
| CN | 101729857 A | 6/2010 |
| EP | 0669587 A2 | 8/1995 |
| EP | 0701371 A1 | 3/1996 |
| EP | 078441 A2 | 7/1997 |
| EP | 0854650 A2 | 7/1998 |
| EP | 0903955 A1 | 3/1999 |
| EP | 0986908 A1 | 3/2000 |
| EP | 1024672 A1 | 8/2000 |
| EP | 1051027 A1 | 11/2000 |
| EP | 1124344 A1 | 8/2001 |
| EP | 1298931 A2 | 4/2003 |
| EP | 1455504 A2 | 9/2004 |
| EP | 1468497 A1 | 10/2004 |
| EP | 1501318 A1 | 1/2005 |
| EP | 1670256 A2 | 6/2006 |
| EP | 1755248 A1 | 2/2007 |
| EP | 2071827 A2 | 6/2009 |
| EP | 1241795 A2 | 8/2009 |
| EP | 2096870 A2 | 9/2009 |
| EP | 1700410 B1 | 4/2010 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001223655 A | 8/2001 |
| JP | 2001251287 A | 9/2001 |
| JP | 2001274776 A | 10/2001 |
| JP | 2001274855 A | 10/2001 |
| JP | 2002073625 A | 3/2002 |

(56) References Cited

FOREIGN PATENT DOCUMENTS

| | | |
|---|---|---|
| JP | 2002204219 A | 7/2002 |
| JP | 2002543705 A | 12/2002 |
| JP | 2003507985 | 2/2003 |
| JP | 2003092564 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004048704 A | 2/2004 |
| JP | 2004070712 A | 3/2004 |
| JP | 2004135013 A | 4/2004 |
| JP | 2004165922 A | 6/2004 |
| JP | 2004192140 A | 7/2004 |
| JP | 2004193992 A | 7/2004 |
| JP | 2004529533 A | 9/2004 |
| JP | 2004289621 A | 10/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005514828 T | 5/2005 |
| JP | 2005204170 A | 7/2005 |
| JP | 2005223433 A | 8/2005 |
| JP | 2005277950 A | 10/2005 |
| JP | 2006503463 A | 1/2006 |
| JP | 2006505177 A | 2/2006 |
| JP | 2006074335 A | 3/2006 |
| JP | 2006074421 A | 3/2006 |
| JP | 2006115104 A | 4/2006 |
| JP | 3809957 | 6/2006 |
| JP | 2006174032 A | 6/2006 |
| JP | 2006174045 A | 6/2006 |
| JP | 2006186419 A | 7/2006 |
| JP | 2006287422 A | 10/2006 |
| JP | 2006319743 A | 11/2006 |
| JP | 2007013675 A | 1/2007 |
| JP | 2007089137 A | 4/2007 |
| JP | 3976163 | 6/2007 |
| JP | 2007158592 A | 6/2007 |
| JP | 2007520961 A | 7/2007 |
| JP | 2007228205 A | 9/2007 |
| JP | 2008011404 A | 1/2008 |
| JP | 2008016907 A | 1/2008 |
| JP | 2008508761 A | 3/2008 |
| JP | 2008508762 A | 3/2008 |
| JP | 2008283232 A | 11/2008 |
| JP | 2008283571 A | 11/2008 |
| JP | 2008543142 A | 11/2008 |
| JP | 2008546361 A | 12/2008 |
| JP | 2009027598 A | 2/2009 |
| JP | 2009522922 A | 6/2009 |
| JP | 2009171558 A | 7/2009 |
| JP | 2009527949 A | 7/2009 |
| JP | 2009544991 A | 12/2009 |
| JP | 2008502212 A | 1/2011 |
| JP | 2001189665 A | 2/2011 |
| JP | 4971144 B2 | 7/2012 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| RU | 99117925 A | 7/2001 |
| RU | 2189629 C2 | 9/2002 |
| RU | 2265960 C2 | 12/2005 |
| RU | 2312390 C2 | 12/2007 |
| TW | 1246841 B | 1/2006 |
| WO | WO9634463 A1 | 10/1996 |
| WO | WO-9750183 A1 | 12/1997 |
| WO | WO9804973 A1 | 2/1998 |
| WO | WO9832231 | 7/1998 |
| WO | WO-9832256 A1 | 7/1998 |
| WO | WO0014921 A1 | 3/2000 |
| WO | WO00018017 | 3/2000 |
| WO | WO0052600 A1 | 9/2000 |
| WO | WO0120786 A1 | 3/2001 |
| WO | WO0157667 A1 | 8/2001 |
| WO | WO0158130 A2 | 8/2001 |
| WO | WO0158131 A2 | 8/2001 |
| WO | WO0227988 A2 | 4/2002 |
| WO | WO0247391 | 6/2002 |
| WO | WO-02063461 A1 | 8/2002 |
| WO | WO03056703 | 7/2003 |
| WO | WO03105350 | 12/2003 |
| WO | WO2004015948 A1 | 2/2004 |
| WO | WO2004019521 A1 | 3/2004 |
| WO | WO2004030273 A1 | 4/2004 |
| WO | WO2004034589 A2 | 4/2004 |
| WO | WO-2004036824 A1 | 4/2004 |
| WO | WO2004040831 A1 | 5/2004 |
| WO | WO-2004047019 A2 | 6/2004 |
| WO | WO2004047455 A1 | 6/2004 |
| WO | WO-2004109538 A1 | 12/2004 |
| WO | WO2005036753 A2 | 4/2005 |
| WO | WO2005041421 A1 | 5/2005 |
| WO | WO2005078982 A1 | 8/2005 |
| WO | WO-2005107123 | 11/2005 |
| WO | WO2005112250 A2 | 11/2005 |
| WO | WO-2006013459 A1 | 2/2006 |
| WO | WO2006020826 A2 | 2/2006 |
| WO | WO-2006036276 | 4/2006 |
| WO | WO-2006057938 A2 | 6/2006 |
| WO | WO-2006060036 A1 | 6/2006 |
| WO | WO2006084503 A1 | 8/2006 |
| WO | WO-2006116102 A2 | 11/2006 |
| WO | WO-2006135878 A2 | 12/2006 |
| WO | 2007078253 A2 | 7/2007 |
| WO | WO2007090834 A2 | 8/2007 |
| WO | WO-2007098397 A2 | 8/2007 |
| WO | 2008011549 A2 | 1/2008 |
| WO | WO-2008023328 A3 | 4/2008 |
| WO | WO2008054100 A1 | 5/2008 |
| WO | 2008086313 A1 | 7/2008 |
| WO | WO2008085013 A1 | 7/2008 |
| WO | WO-2008144004 A1 | 11/2008 |
| WO | WO-2009143741 A1 | 12/2009 |
| WO | WO2010085361 A2 | 7/2010 |
| WO | WO2010088420 A1 | 8/2010 |
| WO | WO2010120804 A1 | 10/2010 |
| WO | 2011059286 A2 | 5/2011 |
| WO | 2011070552 A1 | 6/2011 |
| WO | 2011102792 A1 | 8/2011 |
| WO | WO-2012109614 A1 | 8/2012 |

OTHER PUBLICATIONS

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.

3rd Generation Partnership Project, Technical Specification Group Services and System Aspects Transparent end-to-end packet switched streaming service (PSS), 3GPP file format (3GP) (Release 9 ) , 3GPP Standard, 3GPP TS 26.244, 3rd Generation Partnership Project (3GPP), Mobile Competence Centre , 650, Route Des Lucioles , F-06921 Sophia-Antipolis Cedex , France, No. V8.1.0, Jun. 1, 2009, pp. 1-52, XP050370199.

3rd Generation Partnership Project; Technical Specification Group Services and System Aspects; Transparent end-to-end packet switched streaming service (PSS); 3GPP file format (3GP) (Release 9), 3GPP Standard; 3GPP TS 26.244, 3rd Generation Partnership Project (3GPP), Mobile Competence Centre; 650, Route Des Lucioles; F-06921 Sophia-Antipolis Cedex; France, No. V9.2.0, Jun. 9, 2010, pp. 1-55, XP050441544, [retrieved on Jun. 9, 2010].

(56) References Cited

OTHER PUBLICATIONS

Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).

Aggarwal, C. et al.: "On Optimal Batching Policies for Video-on-Demand Storage Servers," Multimedia Systems, vol. 4, No. 4, pp. 253-258 (1996).

Albanese, A., et al., "Priority Encoding Transmission", IEEE Transactions on Information Theory, vol. 42, No. 6, pp. 1-22, (Nov. 1996).

Alex Zambelli,"IIS Smooth Streaming Technical Overview", Microsoft Mar. 25, 2009, XP002620446, Retrieved from the Internet: URL:http://www.microsoft.com/downloads/en/ details. aspxFamilyID=03d22583-3ed6-44da-8464-blb4b5ca7520, [retrieved on Jan. 21, 2001].

Aljoscha Smolic et al., "Development of a New MPEG Standard for Advanced 3D Video Applications", IEEE International Symposium on Image and Signal Processing and Analysis, Sep. 16, 2009, pp. 400-407, XP031552049, ISBN: 978-953-184-135-1.

Almeroth, et al., "The use of multicast delivery to provide a scalable and interactive video-on-demand service", IEEE Journal on Selected Areas in Communication, 14(6): 1110-1122, (1996).

Alon, et al.: "Linear Time Erasure Codes with Nearly Optimal Recovery," Proceedings of the Annual Symposium on Foundations of Computer Science, US, Los Alamitos, IEEE Comp. Soc. Press, Vol. Symp. 36, pp. 512-516 (Oct. 23, 1995) XP000557871.

Amin Shokrollahi: "LDPC Codes: An Introduction" Internet Citation 2 Apr. 1, 2003, XP002360065 Retrieved from the Internet: URL : http ://www . ipm.ac . ir/IPM/homepage/Amin 2. pdf [retrieved on Dec. 19, 2005].

Amon P et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.

Anonymous: [Gruneberg, K., Narasimhan, S. and Chen, Y., editors] "Text of ISO/IEC 13818-1:2007/PDAM 6 MVC operation point descriptor", 90 MPEG Meeting; 26-10;-2009-Oct. 30, 2009; Xian; (Motion Picture Expertgroup or ISO/IEC JTC1/SC29/WG11), No. N10942, Nov. 19, 2009, XP030017441.

Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008, XP030016172.

Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11) No. N11139, Jan. 22, 2010, XP030017636.

Bar-Noy, et al., "Competitive on-line stream merging algorithms for media-on-demand", Draft (Jul. 2000), pp. 1-34.

Bar-Noy et al. "Efficient algorithms for optimal stream merging for media-on-demand," Draft (Aug. 2000), pp. 1-43.

Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 889-893, XP000464977.

Bitner, J.R., et al.: "Efficient Generation of the Binary Reflected Gray code and Its Applications," Communications of the ACM, pp. 517-521, vol. 19 (9), 1976.

Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].

Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.

Byers, J.W. et al.: "Accessing multiple mirror sites in parallel: using Tornado codes to speed up downloads," 1999, Eighteenth Annual Joint Conference of the IEEE Comupter and Communications Socities, pp. 275-283, Mar. 21, 1999, XP000868811.

Charles Lee L.H, "Error-Control Block Codes for Communications Engineers", 2000, Artech House, XP002642221 pp. 39-45.

Chen, et al., U.S. Patent Application titled "Frame Packing for Asymmetric Stereo Video", filed Feb. 25, 2011.

Chen, et al., U.S. Patent Application titled "One-Stream Coding for Asymmetric Stereo Video", filed Feb. 25, 2011.

Chen Ying et al., "Coding techniques in Multiview Video Coding and Joint Multiview Video Model", Picture Coding Symposium, 2009, PCS 2009, IEEE, Piscataway, NJ, USA, May 6, 2009, pp. 1-4, XP031491747, ISBN: 978-1-4244-4593-6.

Choi S: "Temporally enhanced erasure codes for reliable communication protocols" Computer Networks, Elsevier Science Publishers B.V., Amsterdam, NL, vol . 38, No. 6, Apr. 22, 2002, pp. 713-730, XP004345778, ISSN: 1389-1286, DOI:10.1016/S1389-1286(01)00280-8.

Clark G.C., et al., "Error Correction Coding for Digital Communications, System Applications," Error Correction Coding for Digital Communications, New York, Plenum Press, US, Jan. 1, 1981, pp. 339-341.

D. Gozalvez et,al. "AL-FEC for Improved Mobile Reception of MPEG-2 DVB-Transport Streams" Hindawi Publishing Corporation, International Journal of Digital Multimedia. Broadcasting vol. 2009, Dec. 31, 2009, pp. 1-10, XP002582035 Retrieved from the Internet: URL:http://www.hindawi.com/journals/ijdmb/2009/614178.html> [retrieved on May 5, 2012].

Dan, A. et al.: "Scheduling Policies for an On-Demand Video Server with Batching," Proc. ACM Multimedia, pp. 15-23 (Oct. 1998).

Davey, M.C. et al.: "Low Density Parity Check Codes over GF(q)" IEEE Communications Letters, vol. 2, No. 6 pp. 165-167 (1998).

Digital Fountain: "Specification Text for Raptor Forward Error Correction," TDOC S4-050249 of 3GPP TSG SA WG 4 Meeting #34 [Online] (Feb. 25, 2005) pp. 1-23, XP002425167, Retrieved from the Internet: URL:http://www.3gpp.org/ftp/tsg_sa/WG4_CODEC/TSGS4_34/Docs.

Digital Fountain: "Raptor code specification for MBMS file download," 3GPP SA4 PSM AD-HOC #31 (May 21, 2004) XP002355055 pp. 1-6.

"Digital Video Broadcasting (DVB); Guidelines for the implementation of DVB-IP Phase 1 specifications; ETSI TS 102 542" ETSI Standards, LIS, Sophia Antipoliscedex, France, vol. BC, No. V1.2.1, Apr. 1, 2008 , XP014041619 ISSN: 0000-0001 p. 43 p. 66 pp. 70, 71.

DVB-IPI Standard: DVB BlueBook A086r4 (03/07) Transport of MPEG 2 Transport Streator (TS) Based DVB Services over IP Based Networks, ETSI Technical Specification 102 034 v1.3.1.

Eager, et al. "Minimizing bandwidth requirements for on-demand data delivery," Proceedings of the International Workshop on Advances in Multimedia Information Systems,p. 80-87 (Indian Wells, CA Oct. 1999).

Eager, et al., "Optimal and efficient merging schedules for video-on-demand servers", Proc. ACM Multimedia, vol. 7, pp. 199-202 (1999).

Esaki, et al.: "Reliable IP Multicast Communication Over ATM Networks Using Forward Error Correction Policy," IEICE Transactions on Communications, JP, Institute of Electronics Information and Comm. ENG. Tokyo, vol. E78-V, No. 12, (Dec. 1995), pp. 1622-1637, XP000556183.

Feng, G., Error Correcting Codes over Z2m for Algorithm-Based Fault-Tolerance, IEEE Transactions on Computers, vol. 43, No. 3, Mar. 1994, pp. 370-374.

Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010, XP030046346.

Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].

Gao, L. et al.: "Efficient Schemes for Broadcasting Popular Videos," Proc. Inter. Workshop on Network and Operating System Support for Digital Audio and Video, pp. 1-13 (1998).

Gasiba, Tiago et al., "System Design and Advanced Receiver Techniques for MBMS Broadcast Services" Proc. 2006 International Conference on Communications (ICC 2006), Jun. 1, 2006, pp. 5444-5450, XP031025781 ISBN: 978-1-4244-0354-7.

(56) References Cited

OTHER PUBLICATIONS

Gemmell, et al., "A Scalable Multicast Architecture for One-To-Many Telepresentations", Multimedia Computing and Systems, 1998/Proceedings. IEEE International Conference on Austin, TX, USA Jun. 28-Jul. 1, 1998, Los Alamitos, CA USA, IEEE Comput. Soc, US, Jun. 28, 1998, pp. 128-139, XP010291559.

Goyal: "Multiple Description Coding: Compression Meets the Network," In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Apr. 7, 2011].

Gozalvez D et, al: "Mobile reception of DVB-T services by means of AL-FEC protection" Proc. IEEE Intern. Symposium on Broadband Multimedia Systems and Broadcasting (BMSB '09), IEEE, Piscataway, NJ, USA, May 13, 2009, pp. 1-5, XP031480155 ISBN: 978-1-4244-2590-7.

Grineberg, et al., "Deliverable D3.2 MVC/SVC storage format" Jan. 29, 2009, XP002599508 Retrieved from the Internet: URL:http://www.ist-sea.eu/Public/SEA_D3.2_HHI FF_20090129.pdf [retrieved on Sep. 1, 2010] paragraph [02.3].

Hagenauer, J. : "Soft is better than hard" Communications, Coding and Cryptology, Kluwer Publication May 1994, XP002606615 Retrieved from the Internet : URL: http://www. Int . ei .turn. de/veroeffentlic hungen/I994/ccc94h. pdf [retrieved on Oct. 25, 2010].

He Wenge et al., "Asymmetric Stereoscopic Video Encoding Algorithm Based on Joint Compensation Prediction", IEEE International Conference on Communications and Mobile Computing, Jan. 6, 2009, pp. 191-194, XP031434775, ISBN: 978-0-7695-3501-2.

Hershey, et al., "Random Parity Coding (RPC)", 1996 IEEE International Conference on Communications (ICC). Converging Technologies for Tomorrow's Applications. Dallas, Jun. 23-27, 1996, IEEE International Conference on Communications (ICC), New York, IEEE, US, vol. 1, Jun. 23, 1996, pp. 122-126, XP000625654.

Hitachi Ltd. et al., "High-Definition Multimedia Interface," Specification Version 1.4, Jun. 5, 2009, 425 pp.

Hua, et al., "Skyscraper broadcasting: A new broadcsting system for metropolitan video-on-demand systems", Proc. ACM SIGCOMM, pp. 89-100 (Cannes, France, 1997).

Ian Trow, "Is 3D Event Coverage Using Existing Broadcast Infrastructure Technically Possible", International Broadcasting Conference, Sep. 9, 2009,-Sep. 13, 2009, XP030081671, pp. 4-5, "3D transmission over broadcast infrastructure" pp. 7-8, "Screen signaling"—Conclusions on 3D systems.

IETF RFC 2733: Rosenberg, J. et al. "An RTP Payload Format for Generic Forward Error Correction," Network Working Group, RFC 2733 (Dec. 1999).

International Standard ISO/IEC 14496-12, Information Technology—Coding of audio-visual objects—Part 12: ISO base media file format, Third Edition, Oct. 15, 2008, 120 pp.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

ISO/IEC JTC 1/SC 29, ISO/IEC FCD 23001-6, Information technology—MPEG systems technologies—Part 6: Dynamic adaptive streaming over HTTP (DASH), Jan. 28, 2011.

Jin Li, "The Efficient Implementation of Reed-Solomon High Rate Erasure Resilient Codes" Proc. 2005 IEEE International Conference on Acoustics, Speech, and Signal Processing, Philadelphia, PA, USA, IEEE, Piscataway, NJ, vol. 3, Mar. 18, 2005, pp. 1097-1100, XP010792442, DOI: 10.1109/ICASSP.2005.1415905 ISBN: 978-0-7803-8874-1.

Juhn, L. et al.: "Adaptive Fast Data Broadcasting Scheme for Video-on-Demand Service," IEEE Transactions on Broadcasting, vol. 44, No. 2, pp. 182-185 (Jun. 1998).

Juhn, L. et al.: "Harmonic Broadcasting for Video-on-Demand Service," IEEE Transactions on Broadcasting, vol. 43, No. 3, pp. 268-271 (Sep. 1997).

Kallel, "Complementary Punctured Convolutional (CPC) Codes and Their Applications", IEEE Transactions on Communications, IEEE Inc., New York, US, vol. 43, No. 6, Jun. 1, 1995, p. 2005-2009.

Kimata H et al., "Inter-View Prediction With Downsampled Reference Pictures", ITU Study Group 16—Video Coding Experts Group—ISO/IEC MPEG & ITU-T VCEG(ISO/IEC JTC1/SC29/WG11 and ITU-T SG16 Q6), No. JVT-W079, Apr. 19, 2007, XP030007039.

Kozamernik F: "Media streaming over the Internet", Internet Citation, Oct. 2002, XP002266291, Retrieved from the Internet: URL: http://www.ebu.ch/trev_292-kozamerni k. pdf [retrieved on Jan. 8, 2004] section "Video codecs for scalable streaming".

Lee L., et al.,"VLSI implementation for low density parity check decoder", Proceedings of the 8th IEEE International Conference on Elecctronics, Circuits and Systems, 2001. ICECS 2001, Sep. 2, 2001, vol. 3, pp. 1223-1226.

Lin, S. et al.: "Error Control Coding-Fundamentals and Applications," 1983, Englewood Cliffs, pp. 288, XP002305226.

Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, Ch, Oct. 1, 2007, XP015055125, ISSN: 0000-0003.

Luby, et al., "Analysis of Low Density Codes and Improved Designs Using Irregular Graphs", 1998, Proceedings of the 30th Annual ACM Symposium on Theory of Computing, May 23, 1998, pp. 249-258, XP000970907.

Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].

Luby, et al., "Flute—File Delivery over Unidirectional Transport", IETF RFC 3926, pp. 1-35, (Oct. 2004).

Luby et al., "Improved Low-Density Parity-Check Codes Using Irregular Graphs and belief Propogation", Information Theory, 1998. Proceedings. 1998 IEEE International Symposium on Cambridge, MA, USA Aug. 16-21, 1998 pp. 1-9, New York, NY, USA, IEEE, US Aug. 16, 199.

Luby et, al. "Layered Coding Transport (LCT) Building Block", IETF RFC 5651, pp. 1-42, (Oct. 2009).

Luby, M. et al.: "Efficient Erasure Correction Codes," 2001, IEEE Transactions on Information Theory, Vo. 47, No. 2, pp. 569-584, XP002305225.

Luby, M., et, al. "Forward Error Correction (FEC) Building Block", IETF RFC 5052, pp. 1-31, (Aug. 2007).

Luby M et al: "IPTV Systems, Standards and Architectures: Part II—Application Layer FEC In IPTV Services" IEEE Communications Magazine, IEEE Service Center, Piscataway, US LNKDDOI: 10.1109/MCOM.2008.4511656, vol. 46, No. 5, May 1, 2008, pp. 94-101, XP011226858 ISSN: 0163-6804.

Luby, M. et al.: "Pairwise Independence and Derandomization," Foundations and Trends in Theoretical Computer Science, vol. 1, Issue 4, 2005, Print ISSN 1551-305X, Online ISSN 1551-3068.

Luby, M. et al., "Practical Loss-Resilient Codes: Tornado Codes," 29th Annual ACM Symposium on Theory of Computing, vol. Symp. 29, May 4, 1997, pp. 150-159, XP002271229.

Luby, M., et al., "Raptor Forward Error Correction Scheme for Object Delivery", IETF RFC5053, pp. 1-46 (Sep. 2007).

Luby, M., et al., "RaptorQ Forward Error Correction Scheme for Object Delivery", IETF draft ietf-rmt-bb-fec-raptorq-04, Reliable Multicast Transport, pp. 1-68, (Aug. 24, 2010).

Luby, M., et al., "Request for Comments: 3453: The Use of Forward Error Correction (FEC) in Reliable Multicast," Internet Article, [Online] Dec. 2002, pp. 1-19.

Luby, Michael G. "Analysis of Random Processes via And-Or Tree Evaluation," Proceedings of the 9th Annual ACM-SIAM Symposium on Discrete Algorithms,TR-97-0, 1998, pp. 364-373, (search date: Jan. 25, 2010) URL: <http://portal.acm.prg.citation.cfm"id=314722>.

Mandelbaum D.M., "An Adaptive-Feedback Coding Scheme Using Incremental Redundancy", IEEE Trans on Information Theory, vol. May 1974, pp. 388-389, XP002628271, the whole document.

(56) References Cited

OTHER PUBLICATIONS

Marpe, et al., "The H.264/MPEG4 Advanced Video Coding Standard and its Applications," Standards Report, IEEE Communications Magazine, Aug. 2006, pp. 134-143.
Matsuoka H., et al., "Low-Density Parity-Check Code Extensions Applied for Broadcast-Communication Integrated Content Delivery", Research Laboratories, NTT Docomo, Inc., 3-6, Hikari-No-Oka, Yokosuka, Kanagawa, 239-8536, Japan, ITC-SS21, 2010 IEICE, pp. 59-63.
Mimnaugh, A et, al. "Enabling Mobile Coverage for DVB-T" Digital Fountain Whitepaper Jan. 29, 2008, pp. 1-9, XP002581808 Retrieved from the Internet: URL:http://www.digitalfountain.com/ufiles/library/DVB-T-whitepaper.pdf> [retrieved on May 10, 2010].
Min-Goo Kim: "On systematic punctured convolutional codes", IEEE Trans on Communications, vol. 45, No. 2, Feb. 1997, XP002628272, the whole document, pp. 133-139.
Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.
Naguib, Ayman, et al., "Applications of Space-Time Block Codes and Interference Suppression for High Capacity and High Data Rate Wireless Systems," IEEE, 1998, pp. 1803-1810.
Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, p. 1029-1033.
Nokia: "Reed-Solomon Code Specification for. MBMS Download and Streaming Services", 3GPP Draft; S4-050265_RS_SPEC, 3rd Generation Partnership Project (3GPP), Mobile Competence Centre ; 650, Route Des Lucioles ; F-06921 Sophia-Antipolis Cedex ; France, vol. SA WG4, no. San Diego, USA; Apr. 15, 2005, XP050287675, [retrieved on Apr. 15, 2005].
Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.
Nonnenmacher, et al., "Parity-Based Loss Recovery for Reliable Multicast Transmission", IEEE / ACM Transactions on Networking, IEEE Inc. New York, US, Vol. 6, No. 4, Aug. 1, 1998, p. 349-361.
Ozden, B. et al.: "A Low-Cost Storage Service for Movie on Demand Databases," Proceedings of the 20th Very Large DataBases (VLDB) Conference, Santiago, Chile (1994).
PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).
Pantos R et al., "HTTP Live Streaming; draft-pantos-http-1ive-streaming-OT.txt", HTTP Live Streaming; Draft-Pant0s-Http-Live-Streaming-01.Txt, Internet Engineering Task Force, IETF; Standardworkingdraft, Internet Society (ISOC) 4, Rue Des Falaises Ch-1205 Geneva, Switzerland, No. 1, Jun. 8, 2009, XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio," IEEE Network; Sep./Oct. 1998, pp. 40-48.
Petition decision for Petition Under 37 C.F.R. § 1.78 to Accept an Unintentionally Delayed Priority Claim under 35 U.S.C. § 120 in U.S. Patent No. 7,532,132, dated Jul. 21, 2011, 2 pages.
Petition under 37 C.F.R. § 1.78 to Accept an Unintentionally Delayed Priority Claim under 35 U.S.C. § 120 in U.S. Patent No. 7,532,132, dated May 27, 2011, 2 pages.
Plank J. S., "A Tutorial on Reed-Solomon Coding for Fault-Tolerance I N Raid-Like Systems", Software Practice & Experience, Wiley & Sons, Bognor Regis, GB, vol. 27, No. 9, Sep. 1, 1997, pp. 995-1012, XP00069594.

Pless and WC Huffman EDS V S: Algebraic geometry codes, Handbook of Coding Theory, 1998, pp. 871-961, XP002300927.
Pursley, et al.: "Variable-Rate Coding for Meteor-Burst Communications," IEEE Transactions on Communications, US, IEEE Inc. New York (1989) vol. 37, No. 11, pp. 1105-1112 XP000074533.
Pursley, M. et al.: "A Correction and an Addendum for Variable-Rate Coding for Meteor-Burst Communications," IEEE Transactions on Communications, vol. 43, No. 12 pp. 2866-2867 (Dec. 1995).
Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 22, 2010, XP030046492.
Qualcomm Europe S A R L: "Baseline Architecture and Definitions for HTTP Streaming", 3GPP Draft; 54-090603_HTTP_Streaming_Architecture, 3rd Generation Partnership Project (3GPP), Mobile Competence Centre; 650, Route Des Lucioles; F-06921 Sophia-Antipolis Cedex; France, no. Kista; Aug. 12, 2009, XP050356889.
Qualcomm Incorporated: "Use Cases and Examples for Adaptive httpstreaming", 3GPP Draft; S4-100408-Usecases-HSD, 3rd Generation Partnership Project (JGPP), Mobile Competence Centre; 650, Route Des Lucioles; F-06921 Sophia-Antipolis Cedex; France, vol. SA WG4, no. Prague, Czech Republic; Jun. 17, 2010, XP050438085, [retrieved on Jun. 17, 2010].
Rangan, et al., "Designing an On-Demand Multimedia Service," IEEE Communication Magazine, vol. 30, pp. 56-64, (Jul. 1992).
Realnetworks Inc, et al., "Format for httpstreaming Media Presentation Description", 3GPP Draft; S4-100020, 3rd Generation Partnership Project (3GPP), Mobile Competence Centre; 650, Route Des Lucioles; F-06921 Sophia-Antipolis Cedex; France, vol. SA WG4, no. S t Julians, Malta; 20100125, Jan. 20, 2010, XP050437753, [retrieved on Jan. 1, 2010].
Research in Motion UK Limited: "An MPD delta file for httpstreaming", 3GPP Draft; S4-100453, 3rd Generation Partnership Project (SGPP), Mobile Competence Centre; 650, Route Des Lucioles; F-06921 Sophia-Antipolis Cedex; France, vol. SA WG4, no. Prague, Czech Republic; 20100621, Jun. 16, 2010, XP050438066, [retrieved on Jun. 16, 2010].
Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010, XP030046369.
Rizzo, L. "Effective Erasure Codes for Reliable Computer Communication Protocols," Computer Communication Review, 27 (2) pp. 24-36 (Apr. 1, 1997), XP000696916.
Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).
Roca, V., et, al. "Low Density Parity Check (LDPC) Staircase and Triangle Forward Error Correction (FEC) Schemes", IETF RFC 5170 (Jun. 2008), pp. 1-34.
Rost, S. et al., "The Cyclone Server Architecture: streamlining delivery of popular content," 2002, Computer Communications, vol. 25, No. 4, pp. 1-10.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No. 6, Nov. 1989, pp. 1314-1319.
Seshan, S. et al., "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.
Shacham: "Packet Recovery and Error Correction in High-Speed Wide-Area Networks," Proceedings of the Military Communications Conference. (Milcom), US, New York, IEEE, vol. 1, pp. 551-557 (1989) XP000131876.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T

(56) References Cited

OTHER PUBLICATIONS

REC. H.222.0(May 2006)FPDAM 4, vol. MPEG2009, No. 10572, May 11, 2009, pp. 1-20, XP002605067 p. 11, last two paragraphs sections 2.6.78 and 2.6.79 table T-1.
Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm"id=1148681>.
Shokrollahi et al., "Design of Efficient Easure Codes with Differential Evolution", IEEE International Symposium on Information Theory, Jun. 25, 2000, pp. 5-5.
Sincoskie, W. D., "System Architecture for Large Scale Video on Demand Service," Computer Network and ISDN Systems, pp. 155-162, (1991).
Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Telefon AB LM Ericsson, et al., "Media Presentation Description in httpstreaming", 3GPP Draft; 54-100080-MPD, 3rd Generation Partnership Project (3GPP), Mobile Competence Centre; 650, Route Des Lucioles; F-06921 Sophia-Antipolis Cedex; France, vol. SA WG4, no. St Julians, Malta; 20100125, Jan. 20, 2010, XP050437773, [retrieved on Jan. 20, 2010].
Tsunoda T., et al., "Reliable Streaming Contents Delivery by Using Multiple Paths," Technical Report of the Institute of Electronics, Information and Communication Engineers, Japan, Mar. 2004, vol. 103, No. 692, pp. 187-190, NS2003-331, IN2003-286.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
U.S. Appl. No. 13/082,051, by Ying Chen et al., filed Apr. 7, 2011.
U.S. Appl. No. 13/205,559, by Ying Chen et al., filed Aug. 8 2011.
U.S. Appl. No. 13/205,565, by Ying Chen et al., filed Aug. 8, 2011.
U.S. Appl. No. 13/205,574, by Ying Chen et al., filed Aug. 8, 2011.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010, XP014047290, paragraphs [5.5.4.2], [5.5.4.3], [5.5.4.4], [5.4.5], [5.5.4.6] paragraphs [10.2.3], [11.2.7], [12.2.3], [12.4.2], [12.6.2] paragraphs [12.6.3], [12.6.3.1], [12.6.4], [12.6.6].
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan,Subramaniyam R., "Publishing in Wireless and Wireline Environments," Ph. D Thesis, Rutgers, The State University of New Jersey (Nov. 1994), 180pages.
Watson, M., et, al. "Asynchronous Layered Coding (ALC) Protocol Instantiation", IETF RFC 5775, pp. 1-23, (Apr. 2010).

Wong, J.W., "Broadcast delivery", Proceedings of the IEEE, 76(12): 1566-1577, (1988).
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002, pp. 1551-1553.
Ying Chen et al: "Response to the CfP on HTTP Streaming: Adaptive Video Streaming based on AVC", 93 MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.
Zorzi, et al.: "On the Statistics of Block Errors in Bursty Channels," IEEE Transactions on Communications, vol. 45, No. 6, Jun. 1997, pp. 660-667.
Cataldi et al., "Sliding-Window Raptor Codes for Efficient Scalable Wireless Video Broadcasting With Unequal Loss Protection", IEEE Transactions on Image Processing, Jun. 1, 2010, pp. 1491-1503, vol. 19, No. 6, IEEE Service Center, XP011328559, ISSN: 1057-7149, DOI: 10.1109/TIP.2010.2042985.
Gracie et al., "Turbo and Turbo-Like Codes: Principles and Applications in Telecommunications", Proceedings of the IEEE, Jun. 1, 2007, pp. 1228-1254, vol. 95, No. 6, IEEE, XP011189323, ISSN: 0018-9219, DOI: 10.1109/JPR0C.2007.895197.
Huawei et al., "Implict mapping between CCE and PUCCH for ACK/NACK TDD", 3GPP Draft; R1-082359, 3rd Generation Partnership Project (3GPP), Mobile Competence Centre; 650, Route Des Lucioles ; F-06921 Sophia-Antipolis Cedex ; France, vol. RAN WG1, no. Warsaw, Poland, Jun. 24, 2008, XP050110650, [retrieved on Jun. 24, 2008].
International Search Report and Written Opinion—PCT/US2012/024737—ISA/EPO—May 11, 2012.
Kimura et al., "A Highly Mobile SDM-0FDM System Using Reduced-Complexity-and-Latency Processing", IEEE International Symposium on Personal, Indoor and Mobile Radio Communications (PIMRC), Sep. 1, 2007, pp. 1-5, IEEE, XP031168836, ISBN: 978-1-4244-1143-6, DOI: 10.1109/PIMRC.2007, pp. 1-5, IEEE, XP031168836, ISBN: 978-1-4244-1143-6, DOI: 10.1109/PIMRC.2007.4394758.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].
MacKay, "Fountain codes Capacity approaching codes design and implementation", IEE Proceedings: Communications, Dec. 9, 2005, pp. 1062-1068, vol. 152, No. 6, Institution of Electrical Engineers, XP006025749, ISSN: 1350-2425, DOI: 10.1049/IP-C0M:20050237.
Todd, "Error Correction Coding: Mathematical Methods and Algorithms", Mathematical Methods and Algorithms, Jan. 1, 2005, pp. 451-534, Wiley, XP002618913.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross et al., "WD5: Working Draft 5 of High-Efficiency Video Coding," JCTVCG1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

(56) References Cited

OTHER PUBLICATIONS

European Search Report-EP10013235—Search Authority—The Hague—Aug. 20, 2012.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang., File Format for Scalable Video Coding, PowerPoint Presentation for CMPT 820, Summer 2008.
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Thomas Wiegand et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Wiegand et al., "WD3: Working Draft 3 of High-Efficiency Video Coding," Document JCTVC-E603, 5th Meeting: Geneva, CH, Mar. 16-23, 2011,193 pp.
Wiegand T. et al., "WD2: Working Draft 2 of High-Efficiency Video Coding", 20110128, No. Jctvc-D503, Jan. 28, 2011, XP002679642, Retrieved from the Internet: URL: http://wftp3.itu.int/av-arch/jctvc-site/2011_01_D_Daegu/ [retrieved on Jul. 11, 2012].
Yamanouchi N., et al., "Internet Multimedia Transmission with Packet by Using Forward Error Correction," Proceedings of DPS Workshop, The Information Processing Society of Japan, Dec. 6, 2000, vol. 2000, No. 15, pp. 145-150.
Anonymous: "Technologies under Consideration", 98. MPEG Meeting; Nov. 28, 2011-Feb. 12, 2011; Geneva; (Motion Picture Expert Group or ISO/IEC JTC1/SC29/WG11),, No. N12330, Dec. 3, 2011, XP030018825.
Anonymous: "Text of ISO/IEC IS 23009-1 Media Presentation Description and Segment Formats", 98. MPEG Meeting; Nov. 28, 2011-Dec. 2, 2012; Geneva; (Motion Picture Expert Group or ISO/IEC JTC1/SC29/WG11),, No. N12329, Jan. 6, 2012, XP030018824.
"Digital Video Broadcasting (DVB); Framing structure, channel coding and modulation for digital terrestrial television; ETSI EN 300 744" ETSI Standards, LIS, Sophia Antipolis Cedex, France, V1.6.1, pp. 9, Jan. 10, 2009.
Kim J., et al., "Enhanced Adaptive Modulation and Coding Schemes Based on Multiple Channel Reportings for Wireless Multicast Systems", 62nd IEEE Vehicular Technology Conference, VTC-2005-FALL, Sep. 25-28, 2005, vol. 2, pp. 725-729, XP010878578, DOI: 10.11 09/VETECF.2005.1558019, ISBN: 978-0-7803-9152-9.
Moriyama, S., "5. Present Situation of Terrestrial Digital Broadcasting in Europe and USA", Journal of the Institute of Image Information and Television Engineers, Nov. 20, 1999, vol. 53, No. 11, pp. 1476-1478.
3GPP: "3rd Generation Partnership Project; Technical Specification Group Services and system Aspects; Multimedia Boradcast/Multicast Service (MBMS); Protocols and codecs (Release 6)", Sophia Anipolis, France, Jun. 1, 2005, XP002695256, Retrieved from the Internet: URL:http://www.etsi.org/deliver/etsi_ts/126300_126399/126346/06.01.00_60/ts_126346v060100p.pdf.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3rd Generation Partnership Project (3GPP), Mobile Competence Centre ; 650, Route Del Lucioles ; F-06921 Sophia-Antipolis Cedex ; France, vol. SA WG4, No. V10.0.0, Jun 17, 2011, pp. 1-94, XP050553206, [retrieved on Jun. 17, 2011].
ATIS: "PTV Content on Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/MeetingFiles/Liaison/IIF-WT-063R44_Content_on_Demand.pdf [retrieved on Nov. 22, 2012].

Bouazizi I., et al., "Proposals for ALC/FLUTE server file format (14496-12Amd.2)", 77. MPEG Meeting; Jul. 17, 2006-Jul. 21, 2006; Klagenfurt; (Motion Pictureexpert Group or ISO/IEC JRC1/SC29/WG11), No. M13675, Jul. 12, 2006, XP030042344, ISSN: 0000-0236.
Frojdh P., et al., "Study on 14496-12:2005/PDAM2 ALU/FLUTE Server File Format", 78.MPEG Meeting; Oct. 23, 2006-Oct. 27, 2006; Hangzhou: (Motion Pictureexpert Group or ISO/IEC JTC1/SC29/WG11),, no. M13855, Oct. 13, 2006, XP030042523, ISSN:000-0233.
International Search Report and Written Opinion—PCT/US2012/053394—ISA/EPO—Feb. 6, 2013.
Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_CHANNEL_MAPPING_TO_BCAST_DELIVERY, Open Mobile Alliance (OMA), 4330 La Jolla Village Dr., Suite 110 San Diego, CA 92122; USA OCt. 2, 2007, pp. 1-13, XP064036903.
3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010, p. 85-102, URL,http://www.3gpp.org/ftp/TSG_SA/WG4_CODEC/TSGS4_59/Docs/S4-100511.zip, 26234-930.zip.
Anonymous: "Technologies under Consideration", 100. MPEG Meeting; Apr. 4-5, 2012; Geneva; (Motion Picture Expert Group or ISO/IEC JTC1/SC29/WG11), No. N12682, Jun. 7, 2012, XP030019156.
Bross, et al., "High efficiency video coding (HEVC) text specification draft 6," JCTVC-H1003, Joint Collaboration Team on Video Coding (JCT-VC) of ITU-T SG16 WP3 and ISO-IEC JTC1/SC29/WG11, 8th Meeting: San José, CA USA, Feb. 1-10, 2012, 259 pp.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Hannuksela M.M., et al., "DASH: Indication of Subsegments Starting with SAP", 97. MPEG Meeting; Jul. 18-22, 2011; Torino; (Motion Picture Expert Group or ISO/IEC JTC1/SC29/WG11) No. m21096, Jul. 21, 2011, XP030049659.
Hannuksela M.M., et al., "ISOBMFF: SAP definitions and 'sidx' box", 97. MPEG Meeting; Jul. 18-22, 2011; Torino; (Motion Picture Expert Group or ISO/IEC JTC1/SC29/WG11) No. m21435, Jul. 22, 2011, XP030049998.
Lee, J.Y., "Description of Evaluation Experiments on ISO/IEC 23001-6, Dynamic Adaptive Streaming over HTTP", ISO/IEC JTC/SC29/WG11MPEG2010/N11450, Aug. 6, 2010, URL, http://www.3gpp.org/ftp/tsg_sa/WG4_CODEC/TSGS4_60/Docs/S4-100556.zip, 29n114243.doc.
Li, M. et al., "Playout Buffer and Rate Optimization for Streaming over IEEE 802.11 Wireless Networks", Aug. 2009, Worcester Polytechnic Institute, USA.
Luby et al., RaptorQ Forward Error Correction Scheme for Object Delivery draft-ietf-rmt-bb-fec-raptorq-00, Qualcomm, Inc. Jan. 28, 2010.
Luby M., "LT Codes", Foundations of Computer Science, 2002, Proceedings, The 43rd Annual IEEE Symposium on, 2002.
Makoto N., et al., "On Tuning of Blocking LU decomposition for VP2000 series" The 42th Information Processing Society of Japan Conference (1st term in 1991), Feb. 25, 1991, pp. 71-72, 4B-8.
Michael G et al., "Improved low-density parity-check codes using irregular graphs", Information Theory, IEEE Transactions on, Feb. 2001, vol. 47, No. 2, pp. 585-598.
Miller G., et al., "Bounds on the maximum likelihood decoding error probability of low density parity check codes", Information Theory, 2000 Proceedings. IEEE International Symposium on, 2000, p. 290.
Morioka S., "A Verification Methodology for Error Correction Circuits over Galois Fields", Tokyo Research Laboratory, IBM Japan Ltd, pp. 275-280, Apr. 22-23, 2002.
Muramatsu J., et al., "Low density parity check matrices for coding of multiple access networks", Information Theory Workshop, 2003. Proceedings. 2003 IEEE , Apr. 4, 2003, pp. 304-307.

(56) References Cited

OTHER PUBLICATIONS

Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.
Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AH1/S4-AHI170.zip, S4-AH170_CR_AdaptiveHTTPStreaming-Full.doc.
Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Re1-9.doc.
Qualcomm Incorporated: "RaptorQ Technical Overview", pp. 1-12, Oct. 1, 2010.
Roumy A., et al., "Unequal Erasure Protection and Object Bundle Protection with the Generalized Object Encoding Approach", Inria-00612583, Version 1, Jul. 29, 2011, 25 pages.
Samukawa, H. "Blocked Algorithm for LU Decomposition" Journal of the Information Processing Society of Japan, Mar. 15, 1993, vol. 34, No. 3, pp. 398-408.
Schulzrinne, et al., "Real Time Streaming Protocol (RTSP)" Network Working Group, Request for Comments: 2326, Apr. 1998, pp. 1-92.
Stockhammer T., et al., "DASH: Improvements on Representation Access Points and related flags", 97. MPEG Meeting; Jul. 18-22, 2011; Torino; (Motion Picture Expert Group or ISO/IEC JTC1/SC29/WG11) No. m20339, Jul. 24, 2011, XP030048903.
Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.
Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.
3GPP TSG-SA4 #57 S4-100015, IMS based PSS and MBMS User Service extensions, Jan. 19, 2010, URL: http://www.3gpp.org/ftp/tsg_sa/WG4_CODEC/TSGS4_57/docs/S4-100015.zip.
3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010 p. 85-102, URL, http://www.3gpp.org/ftp/TSG_SA/WG4_CODEC/TSGS4_59/Docs/S4-100511.zip, 26234-930.zip.
Luby M. "Simple Foward Error Correction (FEC) Schemes," draft-luby-rmt-bb-fec-supp-simple-00.txt, pp. 1-14, Jun. 2004.
Chikara S., et al., "Add-on Download Scheme for Multicast Content Distribution Using LT Codes", IEICE. B, Communications, Aug. 1, 2006, J89-B (8), pp. 1379-1389.
Gerard F., et al., "HTTP Streaming MPEG media—Response to CFP", 93. MPEG Meeting, Geneva Jul. 26, 2010 to Jul. 30, 2010.
Hasan M A., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995, pp. 938-942, XP000525729, ISSN: 0018-9340, DOI: 10.1109/12.392853.
Tetsuo M., et al., "Comparison of Loss Resilient Ability between Multi-Stage and Reed-Solomon Coding", Technical report of IEICE. CQ, Communication Quality, vol. 103 (178), Jul. 4, 2003, pp. 19-24.

\* cited by examiner

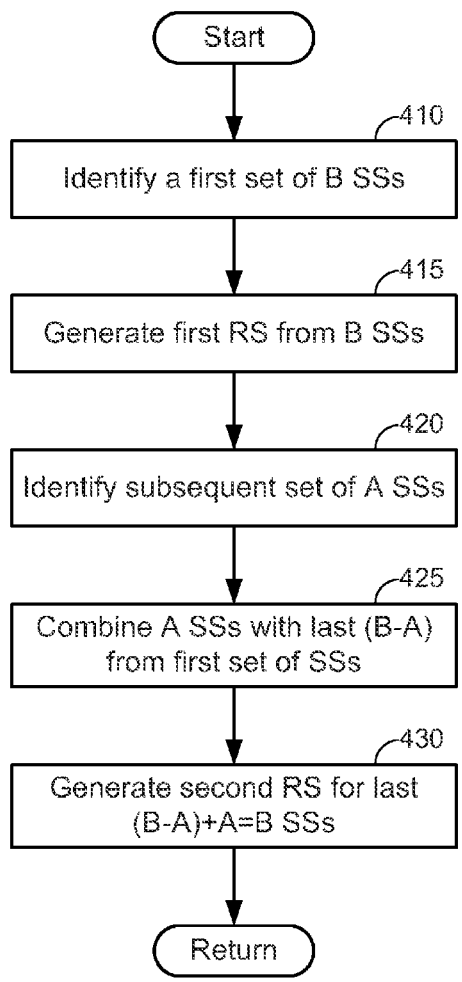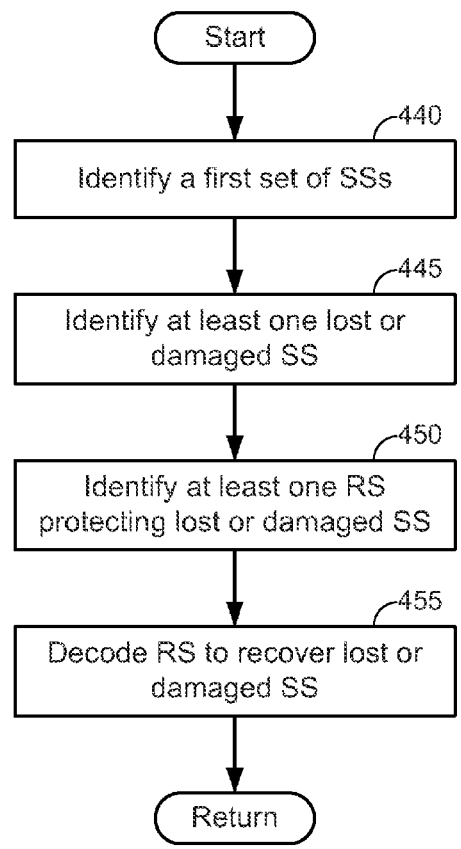
FIG. 4A
FIG. 4B

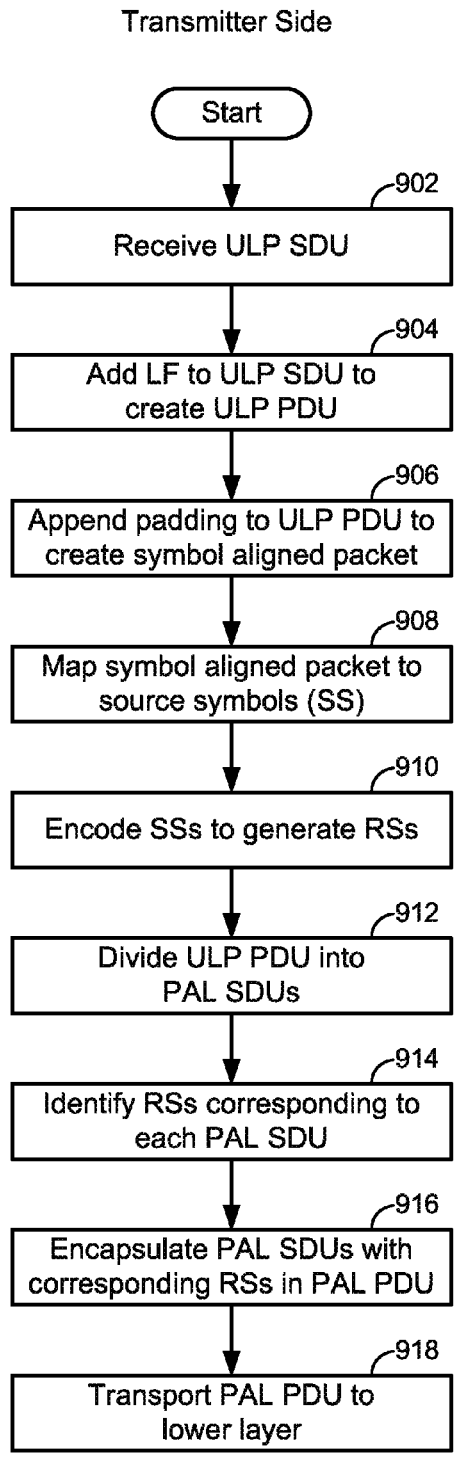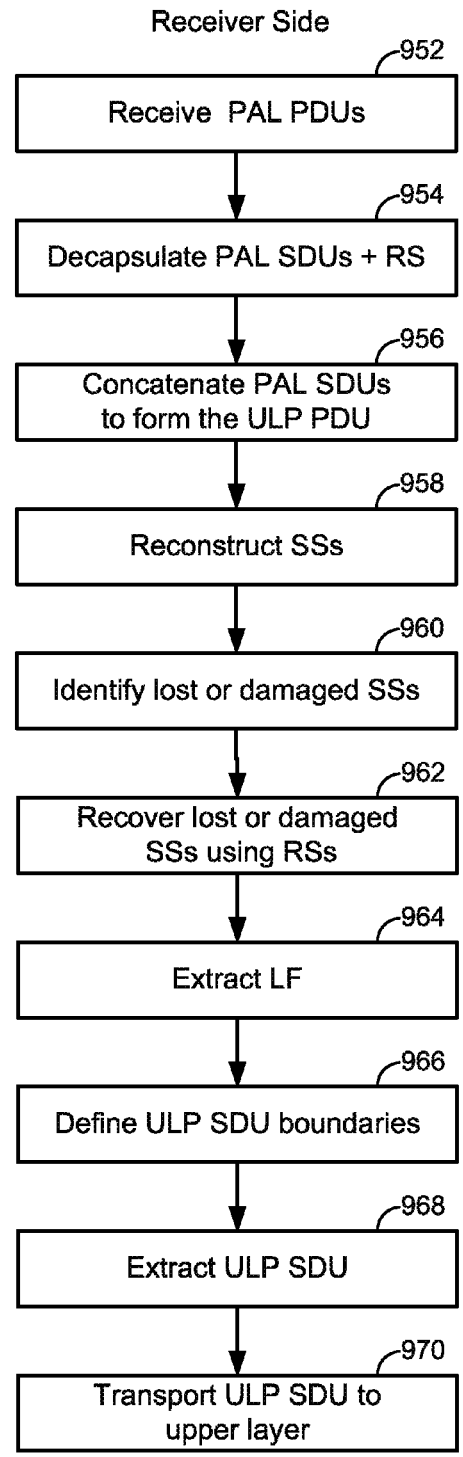
FIG. 9A
FIG. 9B

FRAMING FOR AN IMPROVED RADIO LINK PROTOCOL INCLUDING FEC

RELATED APPLICATIONS

The present Application for Patent is related to the following co-pending U.S. Patent Applications, each of which is filed concurrently herewith, assigned to the assignee hereof, and expressly incorporated by reference herein:

U.S. patent application Ser. No. 13/025,934 entitled "Forward Error Correction Scheduling for an Improved Radio Link Protocol" by Michael G. Luby, et al.;

U.S. patent application Ser. No. 13/025,900 entitled "Encoding and Decoding Using Elastic Codes with Flexible Source Block Mapping" by Michael G. Luby, et al.

TECHNICAL FIELD

The present disclosure relates to electronics and more particularly to framing techniques for an improved Radio Link Protocol (RLP) used in the transport mechanism of data packets in wireless communication systems.

BACKGROUND

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

Wireless communication networks are based on the OSI reference model and are organized as a series of layers with well-defined interfaces, and with each layer built on its predecessor. Each layer performs a related subset of functions and relies on the next lower layer to perform additional functions. Moreover, each layer offers certain services to the next higher layer. Individual layers on one system communicate with respective layers on another system in accordance with a set of rules and conventions constituting a layer protocol. Except from the physical layer, where a physical link exists between the transmitter side and the receiver side of the corresponding layers, all other layers are in virtual communication with their distant peers, forming logical links. These links, logical or physical, are characterized, among other things, by throughput and latency.

Throughput or network throughput is the average rate of successful data packet delivery over a communication channel. This data packet may be delivered over a physical or logical link, or pass through a certain network node. Throughput is usually measured in bits per second (bit/s or bps), and sometimes in data packets per second or data packets per time slot. Latency, on the other hand, is the time taken for a sent data packet to be received at the other end. It includes the time to encode the packet for transmission and transmit it, the time for that data to traverse the network equipment between the nodes, and the time to receive and decode the data.

Many wireless systems, such as the EV-DO system, use the Radio Link Protocol for network-based error corrections to ensure robust data transmission. RLP is designed to optimize the performance data flows for an upper layer, typically an application layer, crossing the wireless link, especially to maximize the utilization of the link. RLP uses packet retransmission to hide the errors at the physical or the MAC layers from the upper layers, presenting a very low error rate to the application layer. At the same time RLP strives to minimize the link end-to-end latency to keep the link throughput as close as the PHY throughput as possible. Both error rate and latency greatly affect TCP performance.

For the most part RLP achieves its goal effectively. There are conditions however where RLP doesn't perform optimally. For example in the presence of packet reordering, RLP tends to assume packet loss and hence trigger unnecessary retransmissions. Similarly, in the presence of high error rate, either at the MAC or the physical layer, the physical layer of a wireless wide area network (WWAN) link is characterized by a frame error rate higher than what typical data application can tolerate.

For example, WWAN supporting TCP/IP data packets cannot tolerate data packet loss without significant throughput degradation. WWAN technology usually addresses this issue with retransmission-based reliability schemes that hide most of the errors from TCP/IP. Such an example is RLP in EV-DO.

If a WWAN system is tuned to operate in a regime where the physical error rate is higher than the standard's settings (1%), the residual error rate presented to RLP would be such that multiple RLP retransmissions could be necessary to present an acceptable error rate at the upper (application) layer. This would significantly increase the latency of the WWAN performance.

Optimization of the operation of upper layer protocols (such as TCP) remains a goal of an improved RLP protocol. Any new RLP protocol should provide: (i) reduced sensitivity to packet reordering, (ii) larger physical error rate operating range, (iii) more consistent latency in the presence of packet loss and/or reordering, (iv) simpler design and (v) good response to burst losses caused, for example, by changing the Serving Sector (cell re-pointing).

BRIEF DESCRIPTION OF THE DRAWINGS

FIG. 4A is a flow diagram of the encoding process of the exemplary embodiment of FIG. 3

FIG. 4B is a flow diagram of the decoding process of the exemplary embodiment of FIG. 3.

FIG. 9A is a flow diagram of packet transporting at a transmitter according to the exemplary embodiment of FIG. 8A.

FIG. 9B is a flow diagram of packet transporting at a receiver according to the exemplary embodiment of FIG. 8A.

Figure 1:
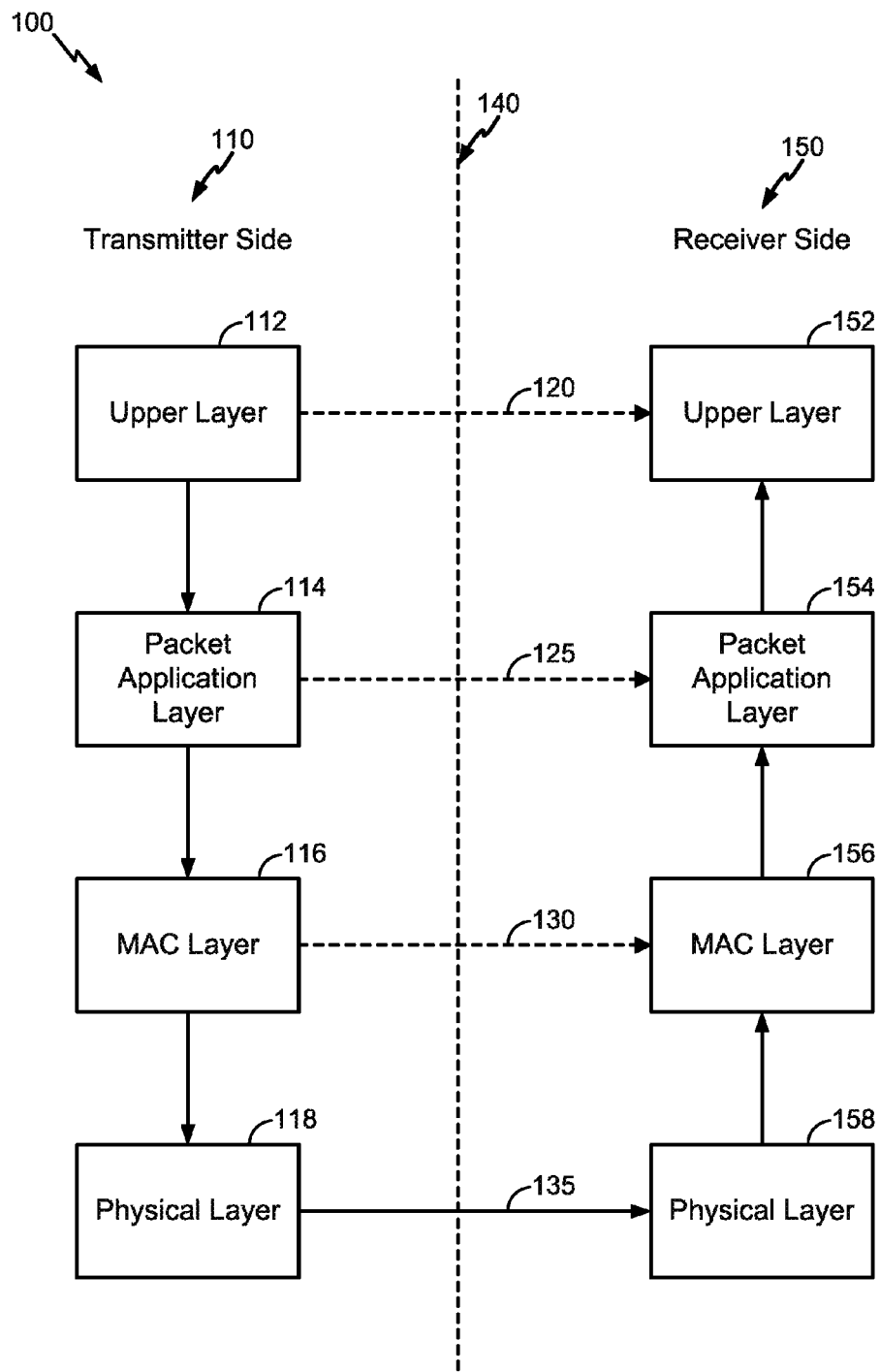
FIG. 1 shows a network layer diagram of a wireless communication system.

To facilitate understanding, identical reference numerals have been used where possible to designate identical elements that are common to the figures, except that suffixes may be added, where appropriate, to differentiate such elements. The images in the drawings are simplified for illustrative purposes and are not necessarily depicted to scale.

The appended drawings illustrate exemplary configurations of the disclosure and, as such, should not be considered as limiting the scope of the disclosure that may admit to other equally effective configurations. Correspondingly, it has been contemplated that features of some configurations may be beneficially incorporated in other configurations without further recitation.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The data transmission techniques described herein may be used for various wireless communication systems such as CDMA, TDMA, FDMA, OFDMA and SCFDMA systems. The terms "system" and "network" are often used interchangeably. A CDMA system may implement a radio technology such as cdma2000, Universal Terrestrial Radio Access (UTRA), etc. cdma2000 covers IS-2000, IS-95, and IS-856 standards. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Cdma 2000 and UMB are described in documents from an organization named "3rd Generation Partnership Project 2" (3GPP2).

For clarity, certain aspects of the techniques are described below for a <High Rate Packet Data (HRPD)> system that implements <IS-856>. HRPD is also referred to as Evolution-Data Optimized (EV-DO), Data Optimized (DO), High Data Rate (HDR), etc. The terms HRPD and EV-DO are often used interchangeably. Currently, HRPD Revisions (Revs.) 0, A, and B have been standardized, HRPD Revs. 0 and A are deployed, and HRPD Rev. C is under development. HRPD Revs. 0 and A cover single carrier HRPD (1×HRPD). HRPD Rev. B covers multi-carrier HRPD and is backward compatible with HRPD Revs. 0 and A. The techniques described herein may be incorporated in any <HRPD revision>

The terms transmitter and receiver used herein refer to the three nodes that the current implementation of the RLP operates: Base Station Controller (BSC), Base Transceiver Station (BTS) and Access Terminal (AT).

These nodes may also support multi-carrier radio link configurations, where multiple radio links are used in parallel to increase the data rate available to the AT. Different radio links are potentially supported either by the same BTS or by physically distinct BTSes. In these configurations, RLP operates assuming independent parallel links on the forward path. As such, it runs a separate flow control protocols on each link. The data packets carry both per-link and global sequence numbers. The former is used for timely packet loss detection, the latter for reassembly and delayed loss detection.

The Multi-carrier configuration is prone to MAC packet re-ordering, that can adversely affect RLP. It would be advantageous to provide techniques to minimize latency at the logical link of the PAL layer by reducing retransmissions. One way of improving the performance of the RLP protocol is by introducing Forward Error Correction (FEC) at the Packet Application Layer (PAL). To address this issue, an enhanced BTS-BSC flow control algorithm is used that aims at reducing the buffer size at the BTS and hence the potential for packet reordering.

FIG. 1 shows a network layer diagram of wireless communication system. Wireless communication system 100 comprises of transmitter 110 and receiver 150 communicating over air channel 140. Transmitter 110 and receiver 150 are organized as a series of layers with well-defined interfaces, and with each layer built on its predecessor. Each layer performs a related subset of functions and relies on the next lower layer to perform additional functions. Moreover, each layer offers certain services to the next higher layer. Individual layers on one system communicate with respective layers on another system in accordance with a set of rules and conventions constituting a layer protocol. For the purposes of this disclosure only four layers are depicted. One skilled in the art can appreciate that a layer organized communication system may comprise more layers corresponding to the OSI reference model, or that more than one layers depicted may correspond to the same layer of the OSI model. In FIG. 1, transmitter 110 comprises upper layer 112, packet application layer 114, MAC layer 116 and physical layer 118. Receiver 150 comprises, respectively, upper layer 152, packet application layer 154, MAC layer 156 and physical layer 158. Each layer communicates with its peer through logical or physical links. Links 120, 125 and 130 are logical links and only link 135 is a physical link. In wireless communication systems the Radio Link Protocol is responsible for the Packet Application Layer.

Figure 2:
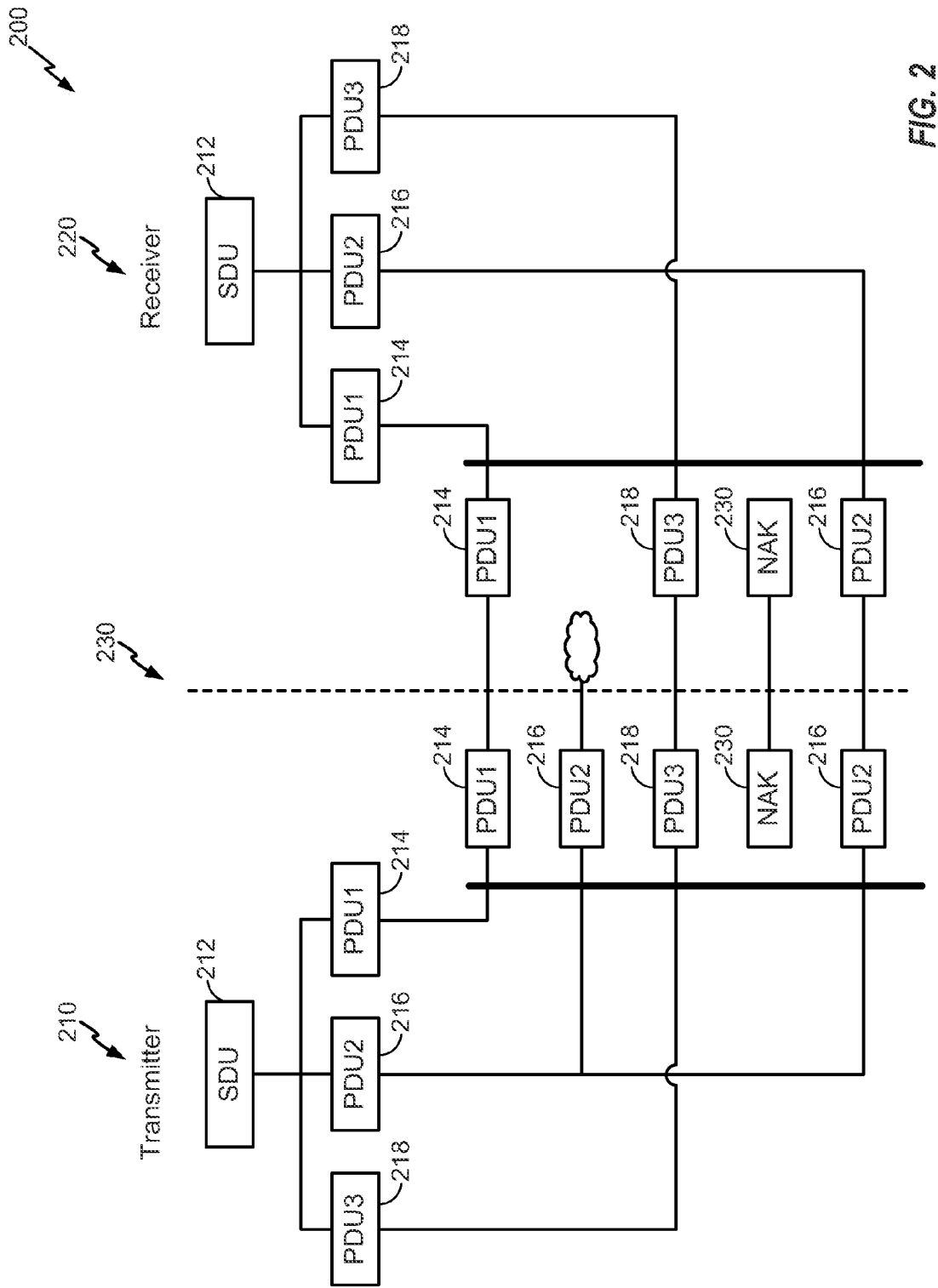
FIG. 2 shows an example Radio Link Protocol (RLP) error correction technique using retransmissions.

FIG. 2 shows an example Radio Link Protocol (RLP) error correction technique using retransmissions. In a typical implementation of the RLP, such as in EV-DO, error correction is handled with retransmission of data once a non-acknowledged (NAK) status message is received from the receiver. Referring to FIG. 2, Transmitter 210 segments upper layer packet SDU 212 into RLP PDUs 214, 216 and 218. Then, transmitter 210 transmits the RLP PDUs to receiver 220. When at least one of the RLP PDUs (in the example PDU2 216) is either lost or received damaged, receiver 220 sends a non-acknowledgment status message 230, requesting retransmission. Transmitter 210, in response, retransmits the lost RLP PDU2 216.

Figure 3:
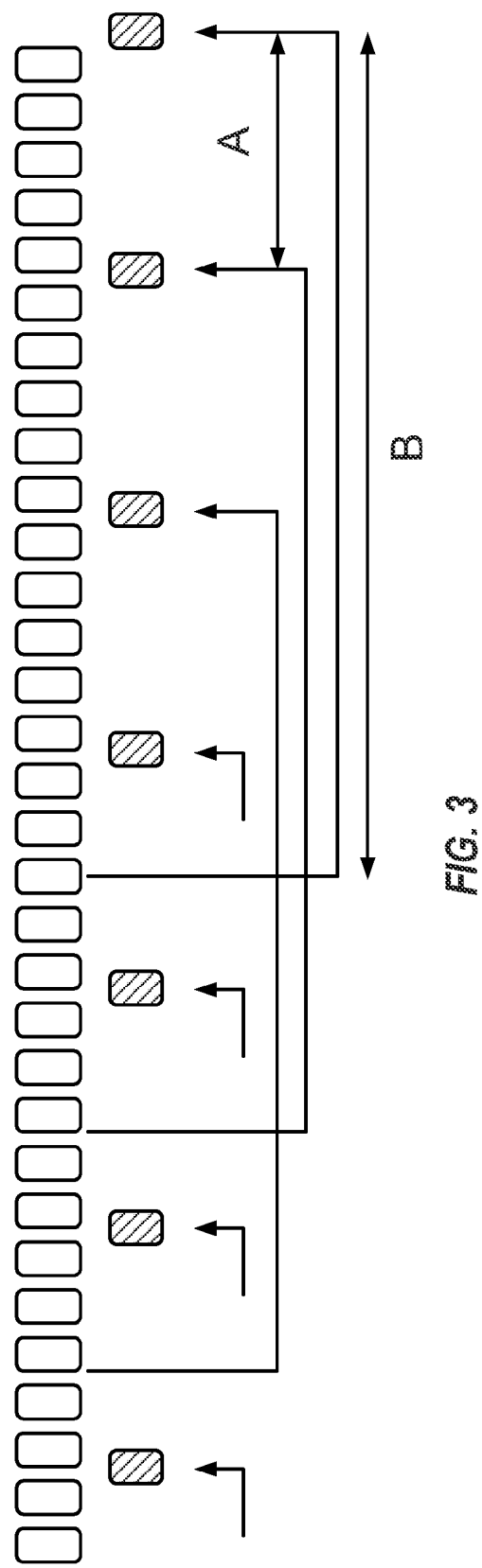
FIG. 3 shows a sequence and scheduling diagram of source and repair symbols based on open-loop chord elastic codes, according to an exemplary embodiment.

FIG. 3 shows a sequence and scheduling diagram of source and repair symbols based on open-loop chord elastic codes, according to an exemplary embodiment. An elastic code is an erasure code in which each repair symbol may be dependent on an arbitrary subset of the source symbols. A chord code is an elastic code in which the source symbols are arranged in a sequence forming a stream of source symbols and each encoding symbol (or repair symbol) is dependent on a set of consecutive source symbols.

Referring to FIG. 3, the upper sequence of symbols consists of source symbols that the transmitter produces by mapping incoming data into symbols. The lower sequence consists of repair symbols generated by the transmitter and are logically transmitted to the receiver along with the source symbols. The newest (most recent) symbols are on the right of the sequence. It should be noted that the sequence shown in FIG. 3 is a Packet Application Layer (PAL) sequence. That means that the symbols (source and repair) are generated in the PAL of the transmitter and reconstructed in the PAL of the receiver. This does not mean that the actual data bits contained in the source symbols has been physically transmitted through the physical layer. The symbols (source and repair) follow a logical link from the PAL of the transmitter to the PAL of the receiver.

FIG. 4A is a flow diagram of the encoding process of the exemplary embodiment of FIG. 3. In a first step 410, the transmitter's PAL module identifies a first set of source symbols of number B in a stream of source symbols (SS). In step 415, the transmitter generates a first repair symbol by encoding the B number of source symbols identified in step 410. Then, the transmitter identifies a subsequent A number of source symbols in step 420 from the same stream of SSs. In step 425, the encoder combines the A number of SSs with the last (B-A) number of SSs at the end of the first set of the SSs identified in step 410, to create an overlapping set of source symbols of number B. In step 430, the transmitter generates a second repair symbol by encoding the overlapping set of SSs of number B.

A number of factors affect the determination of A and B including: (i) the target residual loss rate (Lt), (ii) the expected loss rate at the physical or the MAC layer (Lp), (iii) the average recovery latency that the receiver is willing to introduce in the stream (Davg) and (iv) the maximum recovery latency that the receiver is willing to introduce in the stream (Dmax). In the case of non-bandwidth-adaptive applications, the amount of bandwidth allowable for carrying repair symbols need also to be taken into account when selecting a value for A.

FIG. 4B is a flow diagram of the decoding process of the exemplary embodiment of FIG. 3. In step 440, the receiver's PAL module identifies a set of SSs and a set of RSs. Then, in step 445, the receiver's PAL module identifies at least one lost or damaged SS. Next, in step 450, the receiver identifies at least one RS protecting a portion of the set of SSs where the portion of the set of SSs includes the lost or damaged SS. Finally, in step 455, the receiver's PAL module decodes the RS to restore the lost or damaged SS.

Figure 4C:
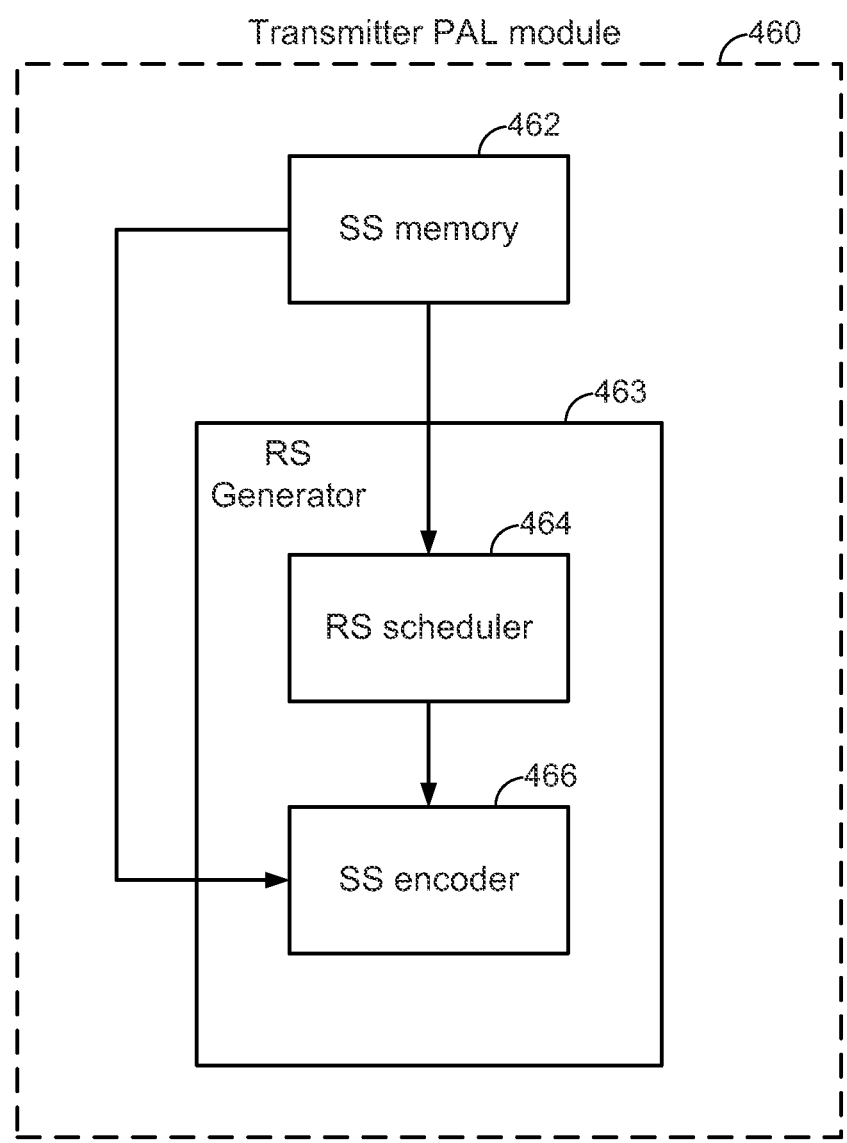
FIG. 4C is a block diagram of a transmitter packet application layer module of the exemplary embodiment of FIG. 3

FIG. 4C is a block diagram of a transmitter packet application layer module of the exemplary embodiment of FIG. 3. Transmitter PAL module 460 comprises of SS memory 462 and RS generator 463. RS generator 463 comprises RS scheduler 464 and SS encoder 466. SS memory 462 stores SSs from a stream of SSs. RS generator 663 identifies SSs according to the method described above with reference to FIG. 4A. RS scheduler 464 identifies a first set of SSs of number B. RS scheduler 464 counts the B number of SSs from the first set and instructs SS encoder 466 to generate an RS from the first set of SSs. Then RS generator 463 identifies a subsequent second set of A SSs. RS scheduler 464 identifies the subsequent A number of SSs. RS generator 463 combines the A number of SSs of the second set and the last (B-A) number of SSs from the first set of SSs to create an overlapping set of SSs of number B. Then SS encoder 466 encodes the overlapping set of SSs to generate a second RS.

Figure 5:
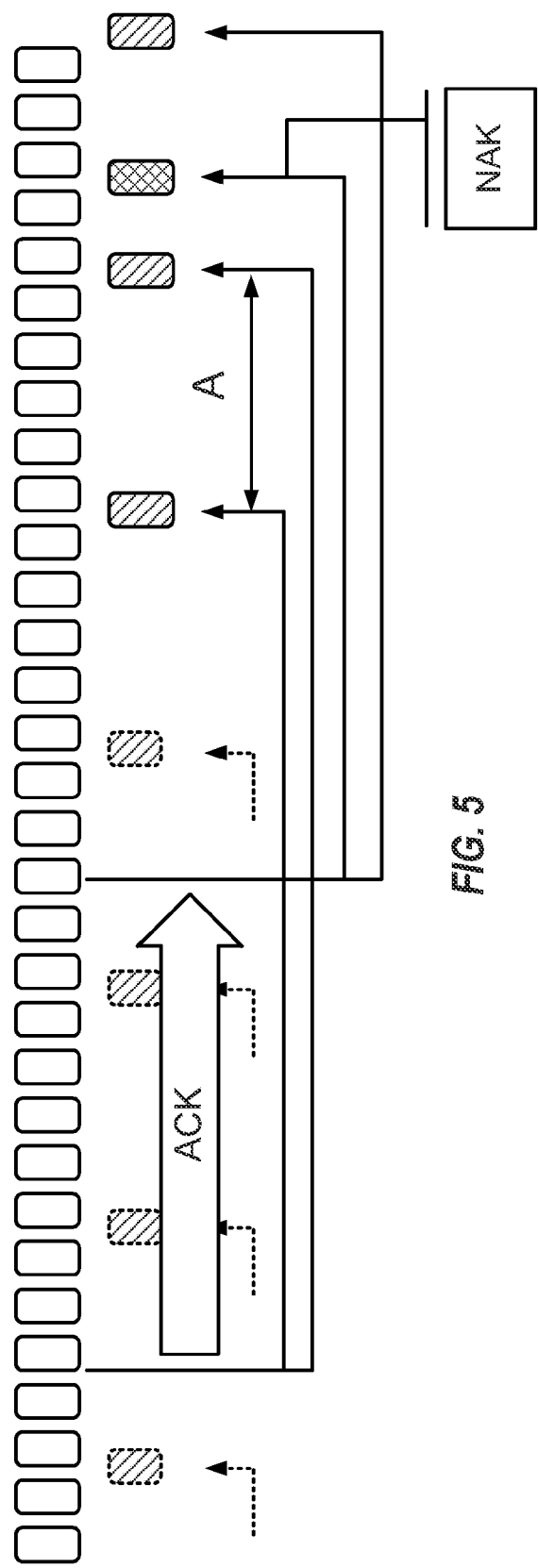
FIG. 5 shows a sequence and scheduling diagram of source and repair symbols based on closed-loop chord elastic codes, according to another exemplary embodiment.

FIG. 5 shows a sequence and scheduling diagram of source and repair symbols based on closed-loop chord elastic codes, according to another exemplary embodiment. The upper sequence is a sequence of source symbols that the transmitter produces by mapping incoming source data into source symbols. The lower sequence is a sequence of repair symbols computed by the transmitter and transmitted to the receiver along with the source symbols. In the open-loop case, no feedback from the receiver was used. In the case of closed-loop chord elastic codes feedback from the receiver, in the form of acknowledgement messages (ACKs) and/or non acknowledgement messages (NAKs), is used to control the trailing edge of the protection window and to schedule the amount of RSs produced, respectively. More particularly, the receiver sends an ACK message to acknowledge the last SS received. The transmitter, then, moves the edge of the protection window up to the last acknowledged SS. The next RS generated, will provide protection back to the next SS after the last acknowledged one. Additionally, extra RSs are produced right after a NAK message has been received. The extra RS provides protection back from the SS that has been non-acknowledged from the receiver with the NAK message until the latest SS identified.

Figure 6A:
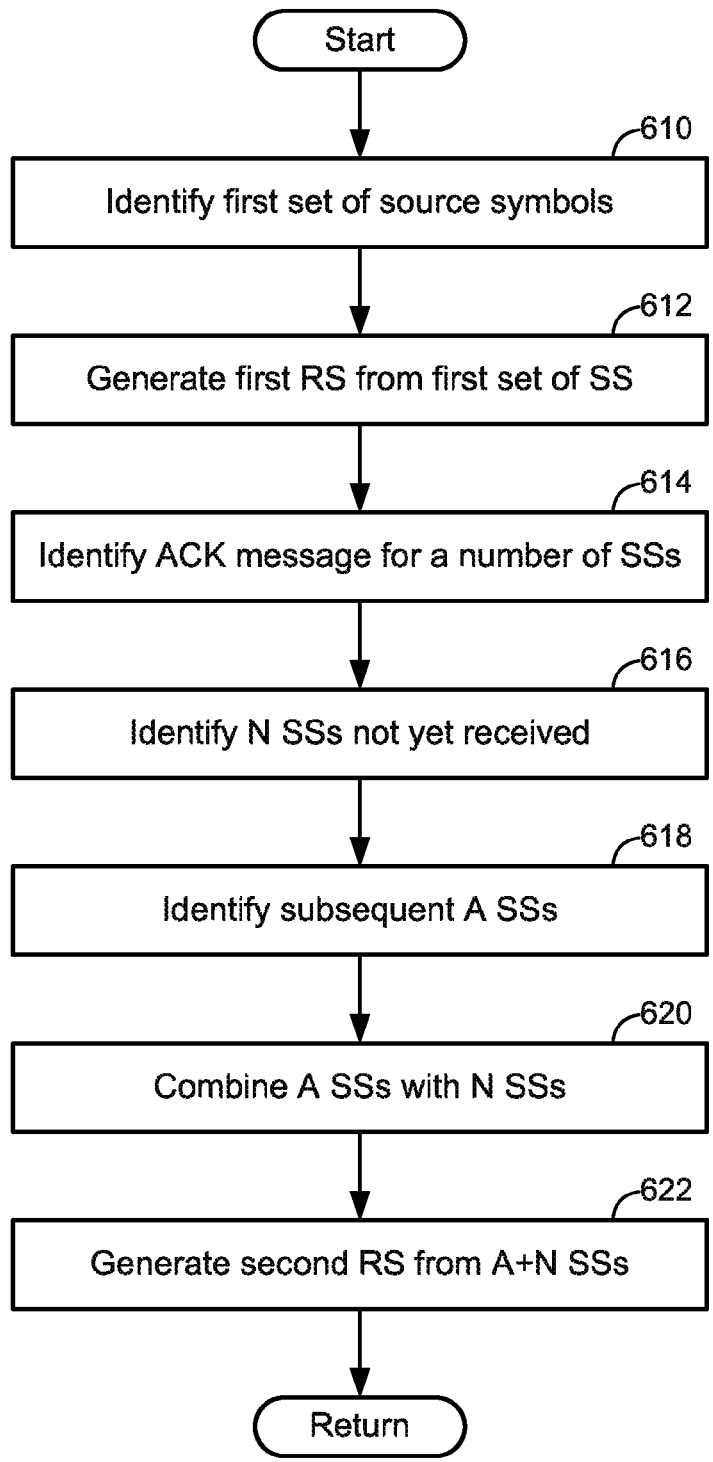
FIG. 6A is a flow diagram of a scheduling process of the exemplary embodiment of FIG. 5, based on ACK messages.

FIG. 6A is a flow diagram of a scheduling process of the exemplary embodiment of FIG. 5, based on ACK messages. In a first step 610, the transmitter's PAL module identifies a first set of B number of source symbols in a stream of SSs. In step 612, the transmitter's PAL module generates a first repair symbol by encoding the B number of source symbols of the first set of source symbols. Then, in step 614, the transmitter's PAL module identifies an acknowledgment (ACK) message sent from the receiver's PAL module, acknowledging receipt for X SSs. In step 616, the transmitter's PAL module identifies N number of source symbols not yet acknowledged from the first set of source symbols. In step 618, the transmitter's PAL module identifies a subsequent A number of SSs since the first RS was generated. In step 620, the transmitter's PAL module combines the A number of SSs with the N number of SSs to create an overlapping sequence of SSs. Finally, in step 622, the transmitter's PAL module generates a second RS from the overlapping sequence of SSs. The process repeats every time an ACK is received and subsequent SSs of number A are identified. Practically, the ACKs from the receiver's PAL module are used to advance the trailing edge of the protection window.

Figure 6B:
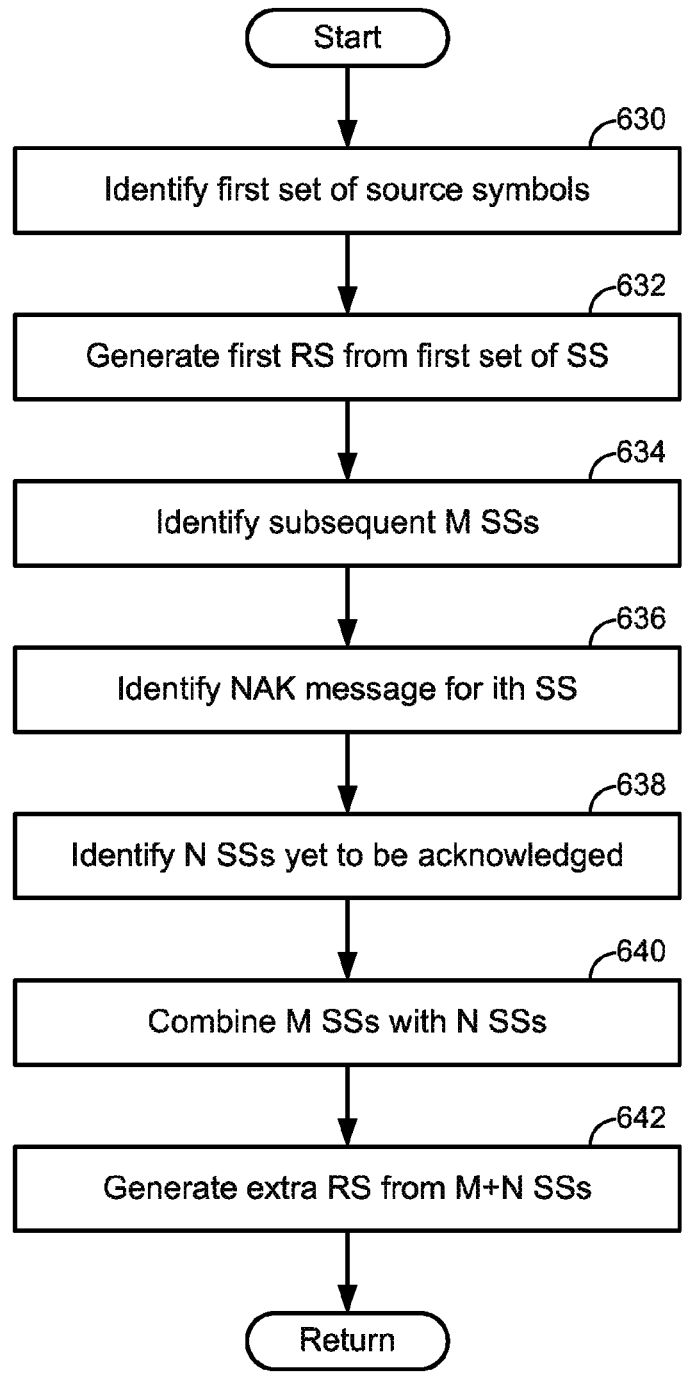
FIG. 6B is a flow diagram of a scheduling process of the exemplary embodiment of FIG. 5, based on NAK messages.

FIG. 6B is a flow diagram of a scheduling process of the exemplary embodiment of FIG. 5, based on NAK messages. In a first step 630, the transmitter's PAL module identifies a first set of B number of source symbols in a stream of SSs. In step 632, the transmitter's PAL module generates a first repair symbol by encoding the B number of source symbols of the first set of source symbols. In step 634, the transmitter's PAL module identifies a second set of SSs subsequent to the first set of M number of SSs. In step 636, the transmitter's PAL module identifies a non-acknowledgment (NAK) message received from the receiver's PAL module for a particular SS from the first set of SSs. Then, in step 638, the transmitter's PAL module identifies an N number of SSs from the first set of SSs that are yet to be acknowledged. Then, in step 640, the transmitter's PAL module combines the M number of SSs of the second set with the N number of SSs from the first set, to create an overlapping set of SSs. Finally, in step 642, the transmitter's PAL module generates an extra RS from the overlapping set of SSs. The NAKs are used to control the amount of RSs sent.

An alternative choice would be to retransmit the missing source symbol in response to a NAK instead of sending an extra RS. Sending an extra RS however is likely to be more efficient as the retransmitted SS might not be useful after all, either because an existing RS already recovered it or because it was never missing in the first place (NAK indication is not always 100% reliable). The extra RS has some likelihood of being useful even if not for repairing the SS that triggered it.

Figure 6C:
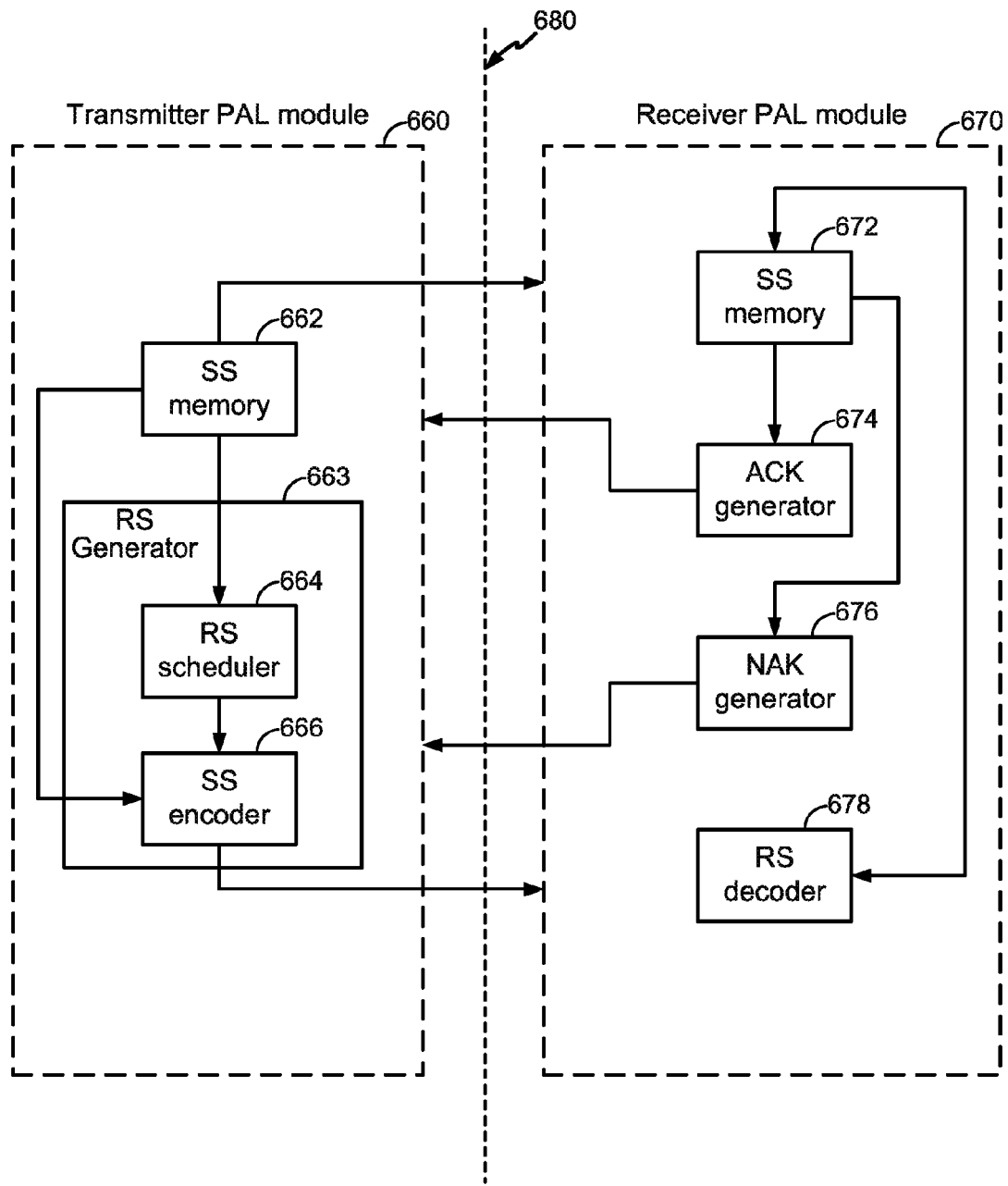
FIG. 6C is a block diagram of a transmitter PAL module and a receiver PAL module of the exemplary embodiment of FIG. 5.

FIG. 6C is a block diagram of a transmitter PAL module and a receiver PAL module of the exemplary embodiment of FIG. 5. Transceiver comprises of transmitter PAL module 660 and receiver PAL module 670. Transmitter PAL module 670 comprises of SS memory 662 and RS generator 663. RS generator 663 comprises RS scheduler 664 and SS encoder 666. Receiver PAL module 670 comprises SS memory 672, ACK generator 674, NAK generator 676 and RS decoder 678. SS memory 662 stores SSs from a stream of SSs. RS generator 663 identifies SSs according to the method described above with reference to FIG. 6A. RS scheduler 664 identifies a first set of SSs of number B. RS scheduler 664 counts the B number of SSs from the first set and instructs SS encoder 666 to generate an RS from the first set of SSs. Then RS generator 663 identifies a subsequent second set of A SSs. The SSs are sent to receiver PAL module and are stored in SS memory 672. ACK generator 674 identifies the last SS received correctly in SS memory 672 and sends an ACK message acknowledging receipt up to a particular SS leaving N number of SSs out of the first set yet to be acknowledged. RS scheduler 664 identifies the subsequent A number of SSs. RS generator 663 first combines the A number of SSs of the second set and the N number of SSs from the first set of SSs to create an overlapping set of SSs of number N+A. Then SS encoder 666 encodes the overlapping set of SSs to generate the second RS. Additionally, based on feedback messages from NAK generator 676, RS generator 663 computes extra (unscheduled) RSs by encoding N+M number of SSs, where M is the number of SSs identified after the last RS was generated until the NAK message was received. The RSs from the RS generator 663 are transmitted over the, typically wireless, channel 680 and are decoded by RS decoder 678 to recover lost or missing SSs. The received or recovered SSs are stored in SS memory 678.

Both the open-looped and the closed-loop designs of repair symbol generation using chord elastic codes improves latency and latency variation in wireless communication systems over existing RLP protocol implementations such as EV-DO RLP protocols. However, introducing FEC at the PAL layer affects throughput because padding bytes are used for symbol aligning. Further optimization of the PAL throughput can be achieved if the padding octets used to symbol align source data, arriving to the PAL from an upper layer, to source symbols is not sent over the air. This can be achieved by appending indicators of the upper layer packet boundaries, instead of the actual padding, to the source or to the repair data.

At the PAL layer, messages larger than a specified size are subdivided prior to encoding and transmission into data packets not exceeding a specified size. In certain networks, these data packets are then mapped, for encoding purposes, to symbols of known length prior to transmission, according to predetermined Forward Error Correction (FEC) rules. An example is the protocol for streaming delivery in Multimedia Broadcast/Multicast Service (MBMS) described in 3GPP TS 26.346 V6.0.0 (2005-03), incorporated herein by reference.

In MBMS, a source block is created for mapping the source data to source symbols. The FEC source block shall contain at least one complete source packet, and a length field of two octets indicating the length of the source packet. Source packets in the source block are symbol aligned for efficiency purposes. To symbol align the source packet data, the information for each source packet placed into the source block is required to have a length that is an integer multiple of symbol length. If the length of the source packet plus the length of the length field does not comply with this requirement, padding bits, in octets of 0's, are added, typically, so that the overall length of the information for the source packet placed into the source block, defined by a Length Field (LF), the original source packet, plus potential padding, becomes an integer multiple of symbol length.

Radio Link Protocol currently provides retransmission and duplicate detection for an octet aligned data stream or a stream of packets. The RLP encapsulates these upper layer data packets (ULP) into packet application layer frames. The frames include the upper layer payload, which is at least a portion of the actual ULP data plus ULP framing information. The RLP separates the ULPs by adding a header that includes flags, or by including unique bit sequences that indicate the beginning and end of a frame within the source octet stream.

Typically, the resulting frame comprises flags and ULP data and is delivered to the next lower layer, which is the MAC layer. Eventually, through the MAC layer, the packet is delivered to the physical layer and is transmitted to the receiver.

Figure 7:
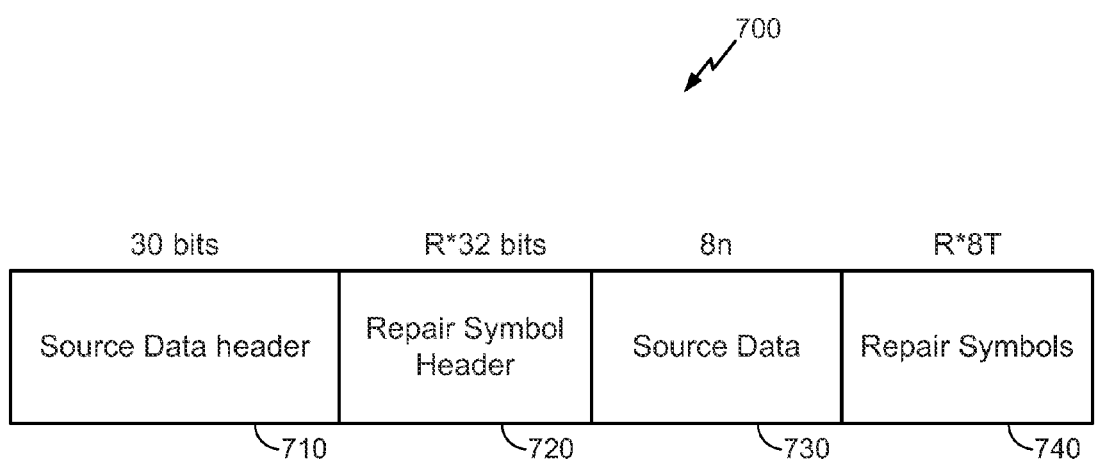
FIG. 7 shows a Packet Application Layer PDU packet format according to an exemplary embodiment.

FIG. 7 shows a Packet Application Layer PDU packet format according to an exemplary embodiment. PAL PDU 700 comprises source data header 710, repair symbol header 720, source data octets 730 and repair symbols 740. Source data header 710 comprises 30 bits and RS header 720 comprises 32 bits for each RS.

Figure 8A:
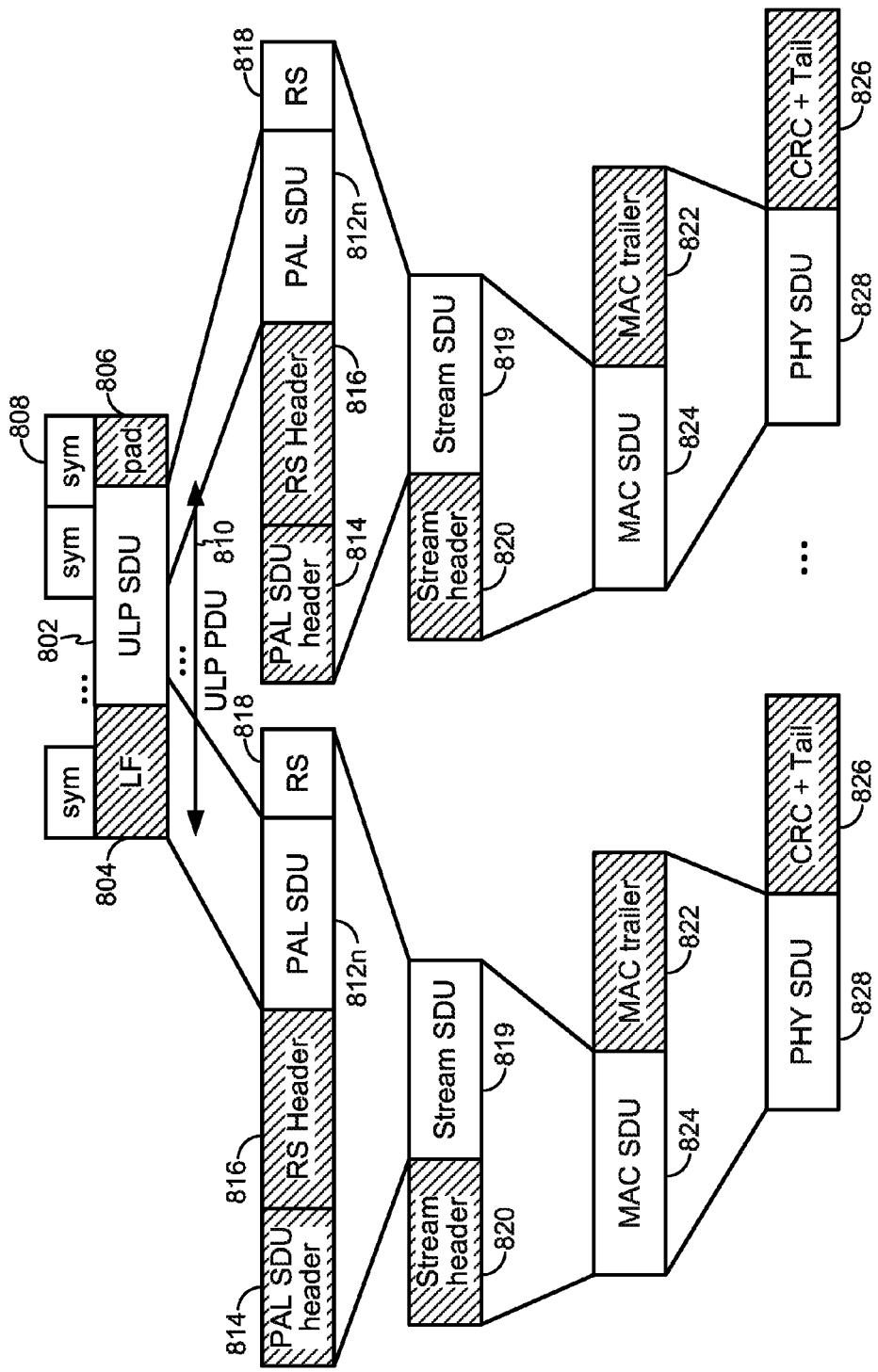
FIG. 8A shows a data flow diagram in accordance with an exemplary embodiment.

FIG. 8A shows a data flow diagram in accordance with an exemplary embodiment. Typically the data entity from/to a higher protocol layer is known as Service Data Unit (SDU) and the corresponding entity from/to a lower protocol layer entity is denoted Protocol Data Unit (PDU). Referring now to FIG. 8, ULP SDU 802 arrives from an upper layer (typically an application layer). Length Field (LF) 804 is added to ULP SDU 802 to create ULP PDU 810 where the length field is an indication of the boundaries of the ULP SDU. Then padding 806, typically in the form of octets, is appended to create a packet symbol aligned with symbols 808 for encoding purposes as described earlier. Symbol 808 has a length of T bits. ULP PDU 810, including only LF 804 and ULP SDU 802, is then segmented into several PAL SDUs 812(i . . . n), so that, whenever possible, each PAL SDU 812 is placed in one physical packet. It should be noted that ULP PDU 810 includes no padding. Subsequently, RSs are generated based on chord elastic encoding scheduling described earlier and are encapsulated in the same PAL packets with corresponding PAL SDUs 812(i . . . n). Appropriate framing and flow headers, such as PAL headers 816 and RS headers 814, are included in the encapsulation and the PAL PDUs are formed. PAL PDUs are formatted according to the PAL PDU packet format shown in FIG. 7. Each RS shall be encapsulated in a PAL PDU subsequent to the PAL PDU containing the last source octet protected by the RS. However, if insufficient source data is available to fill a PAL PDU, and one or more repair symbols could be included in the same Packet Application Layer packet without reducing the amount of source data in that packet, then a repair symbol may be encapsulated in the same PAL PDU as the last source octet it protects. In case the mode of operation is stream mode each PAL PDU is delivered as Stream SDU 819 where stream header 820 is added to form a stream PDU. The stream PDU is delivered to the MAC layer as MAC SDU 824. In case the mode of operation is packet mode the stream sub-layer is skipped and the PAL PDU is delivered to the MAC layer as MAC SDU. MAC trailer 822 is added to MAC SDU 824 to form a MAC PDU. The MAC PDU is delivered to the physical layer as PHY SDU 828 where Cyclic Redundancy Check (CRC) and tail trailer 826 are added to form the PHY PDU that will be transmitted across the physical layer to the receiver.

Figure 8B:
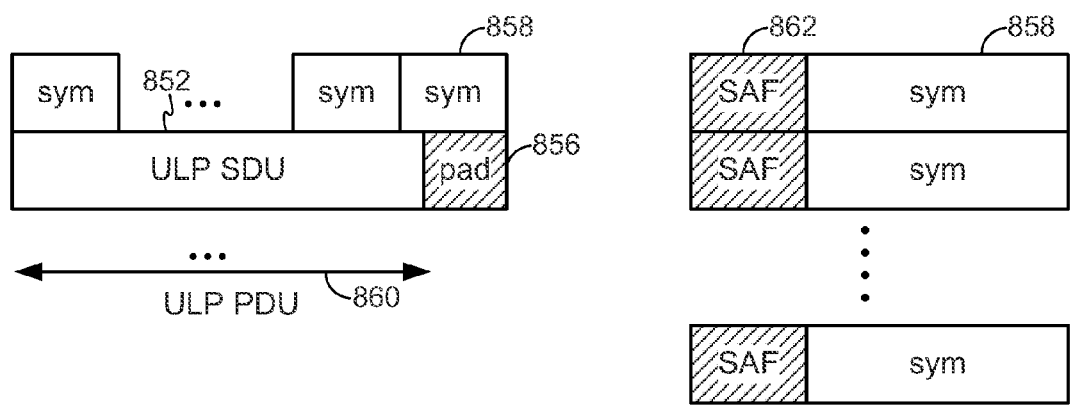
FIG. 8B shows an alternative symbol aligning process for the exemplary embodiment of FIG. 8A.

FIG. 8B shows an alternative symbol aligning process for the exemplary embodiment of FIG. 8A. Padding 856 is appended to ULP SDU 852 (without a length field) for symbol aligning with symbols 858. Symbol 858 has a length of T bits. ULP PDU 860, now, comprises only of ULP SDU 852. Now, instead of adding a LF to a ULP SDU for indicating the boundaries of a ULP PDU, Symbol Auxiliary Field (SAF) 862 of n bits is appended to each symbol 858. This field comprises a one bit "Start" indicator and an n-1 bit "PadPlusOne" indicator. For each SS, the "Start" bit of the Symbol Auxiliary Field is set to one if and only if the source symbol contains the beginning of a ULP SDU. The "PadPlusOne" bit contains the number of padding octets at the end of the SS, or zero if the SS does not contain the end of a ULP PDU.

FIG. 9A is a flow diagram of framing a packet for transporting to a lower layer at a transmitter according to the exemplary embodiment of FIG. 8A. In step 902, the transmitter PAL module receives a ULP SDU. Then, in step 904, a LF of two bytes is added to the ULP SDU to create a ULP PDU, where the LF is the length of the ULP SDU in octets. Then appropriate padding in the form of octets is added, in step 906, to create a symbol aligned packet. That means that the total length of the LF, the ULP PDU and the padding is an integer multiple of symbol length. Then, in step 908, the symbol aligned packet, containing the LF, the ULP SDU and the padding, is mapped to source symbols. In step 910, the SSs are encoded to generate repair symbols according to chord elastic encoding described earlier in this application. Then, in step 912, the ULP PDU, without any padding, is segmented into PAL SDUs. Next, in step 916, the PAL SDUs are encapsulated with corresponding RSs to form PAL PDUs. Corresponding RSs comprise RSs generated to protect the SSs that were included in the previous PAL SDU, as described earlier with reference to FIG. 8. Finally, in step 918 the PAL PDU is delivered to a lower layer and is eventually transmitted.

FIG. 9B is a flow diagram of packet transporting at a receiver according to the exemplary embodiment of FIG. 8A. On the receiver side, in step 952, the receiver's PAL module receives the PAL PDUs. In step 952, the PAL SDUs and the corresponding RSs are decapsulated. Then, in step 956, the APL SDUs are concatenated to form the ULP PDU. In step 958, the SSs are reconstructed. Then, in step 960 the lost or damaged SSs are identified. Using the RSs, the lost or damaged SSs are recovered in step 962. Then, the LF of the ULP PDU is extracted, in step 964, to identify the boundaries of the recovered ULP SDU, in step 966. In step 968, the ULP SDU is extracted. Finally, in step 970, the ULP SDU is delivered to the upper layer.

Figure 10A:
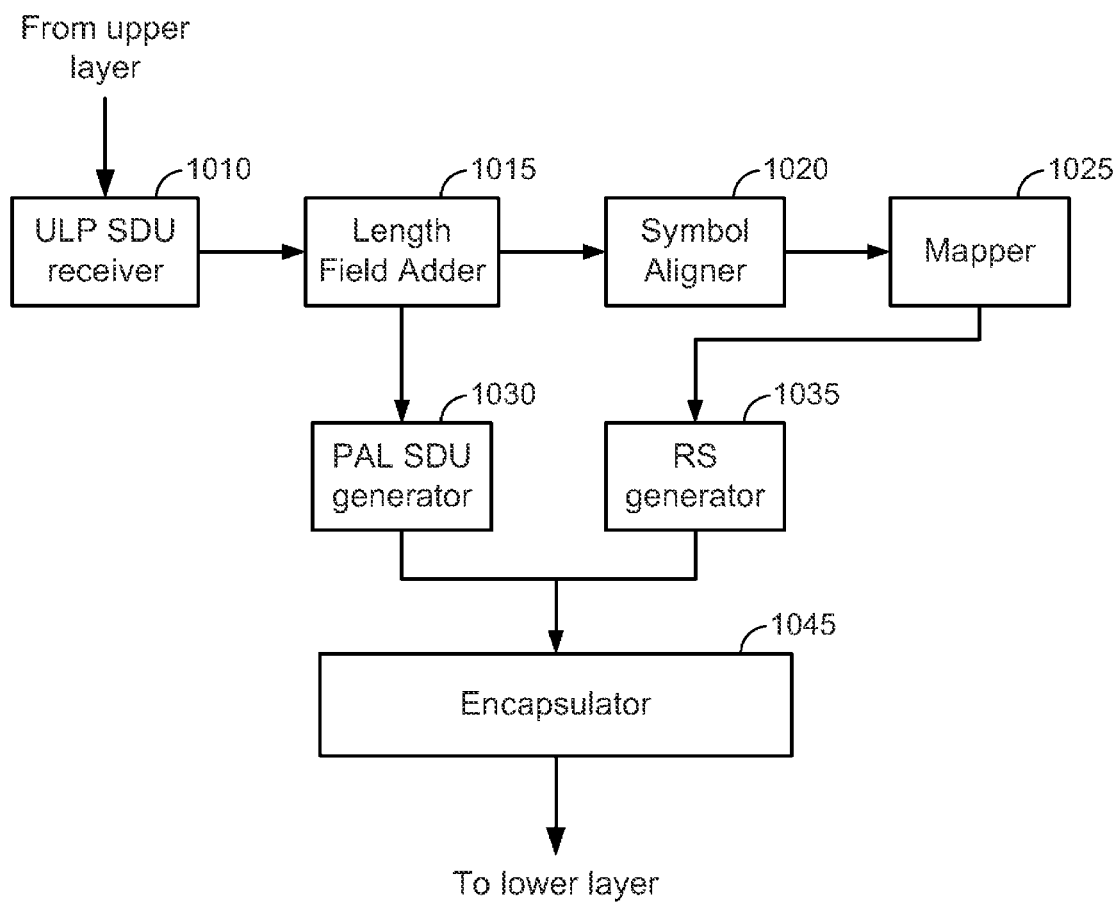
FIG. 10A is a block diagram of a transmitter PAL module according to the exemplary embodiment of FIG. 8A.

FIG. 10A is a block diagram of a transmitter PAL module according to the exemplary embodiment of FIG. 8A. Transmitter PAL module 1000 comprises ULP SDU receiver 1010 acting as an interface for receiving a ULP SDU from an upper layer. ULP SDU receiver 1010 forwards the ULP SDU to Length Field adder 1015, where a length field, corresponding to the length of the ULP SDU in octets, is appended to the ULP SDU to form a ULP PDU. LF adder 1015 forwards the ULP PDU comprising ULP SDU and the LF to symbol aligner 1020 and to PAL SDU generator 1030. Symbol aligner 1020 adds appropriate padding to the ULP PDU to form a symbol aligned packet. The length of the symbol aligned packet must be an integer multiple of one symbol length. Symbol aligner 1020 forwards the symbol aligned packet to Mapper 1025 where the symbol aligned packet is mapped to source symbols. The source symbols are then fed to RS generator 1035, where the repair symbols are generated from the source symbols they are going to protect based on chord elastic codes as described earlier. In parallel, PAL SDU generator 1030 receives the ULP PDU, comprising ULP SDU and LF (no padding included) and segments it to generate a plurality of PAL SDUs. In principle, the size of each PAL SDU must be such that only one PAL SDU is included in each physical layer packet. Each PAL SDU coming from PAL SDU generator 1030 and RS symbols coming from RS generator 1035, are fed to encapsulator 1045 where appropriate headers are added as described with reference to FIG. 7. Encapsulator 1045 produces PAL PDUs that are subsequently delivered to lower layers for further framing and processing. It is noted that the RSs encapsulated with a PAL SDU protect, generally, source symbols that were encapsulated in previous PAL PDUs. However, if insufficient source data is available to fill a PAL PDU, and one or more repair symbols could be included in the same PAL PDU without reducing the amount of source data in that packet, then a repair symbol may be included in the same PAL PDU with the last source data octet it protects.

Figure 10B:
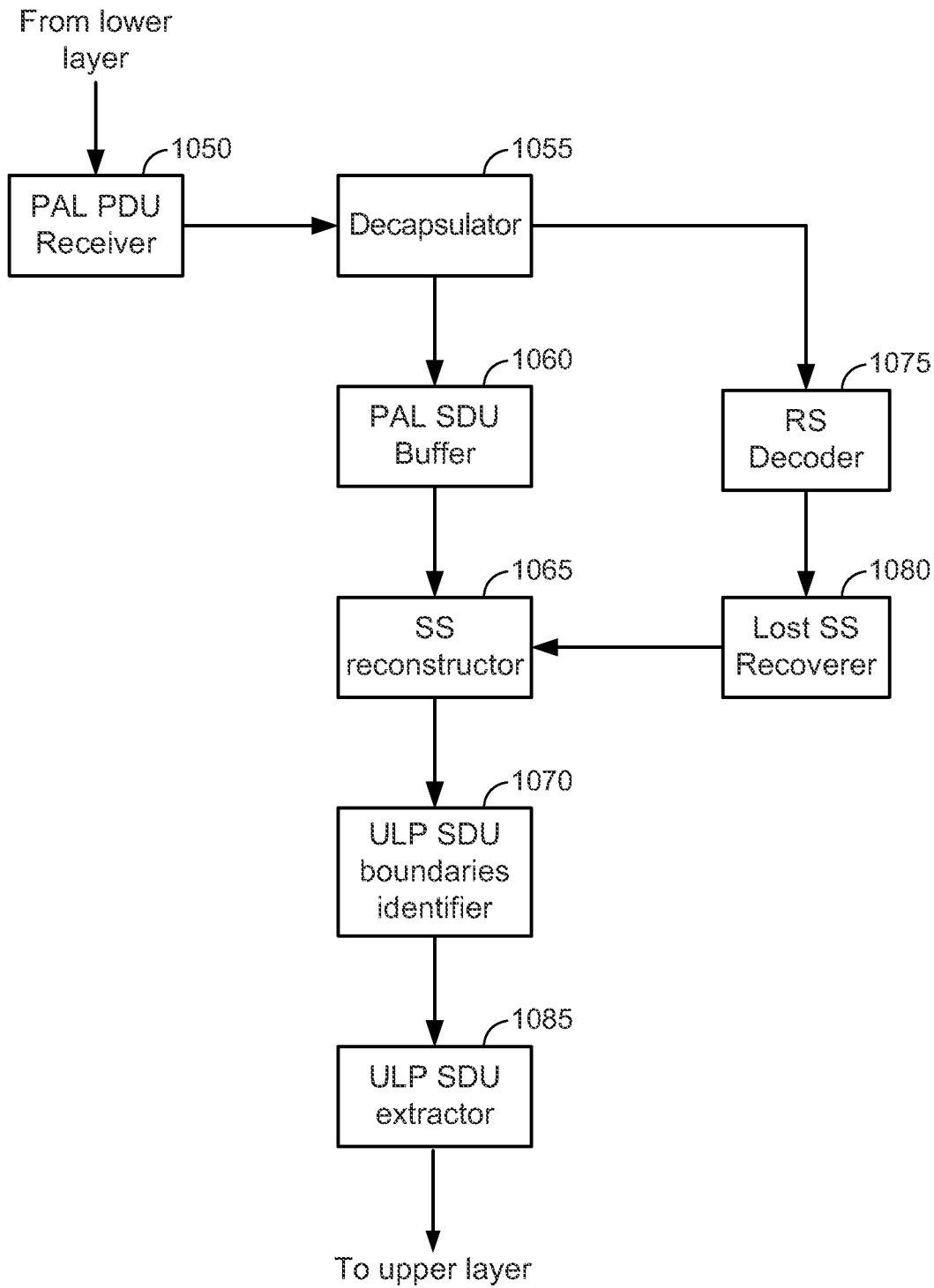
FIG. 10B is a block diagram of a receiver PAL module according to the exemplary embodiment of FIG. 8A.

FIG. 10B is a block diagram of a receiver PAL module according to the exemplary embodiment of FIG. 8A. PAL PDU receiver 1050 receives a PAL PDU from a lower level. Then, PAL Decapsulator 1055 decapsulates the PAL SDU and the corresponding RSs included in the PAL PDU. Each PAL SDU is fed to PAL SDU buffer 1060 where it stays until all PAL SDU's belonging to the same ULP PDU have been received. Then, PAL SDU buffer 1060 concatenates the PAL SDUs to form a provisional ULP SDU. The concatenated ULP SDU is fed to SS reconstructor 1065 where the SSs are reconstructed. In parallel, decoder 1075 receives RSs from Decapsulator 1055 and the reconstructed SSs. Decoder 1075 decodes the relevant RSs and feeds SS reconstructor 1065. The reconstructed or recovered SSs are fed to ULP SDU boundaries identifier 1070. There, the LF is identified and ULP SDU extractor 1085 is subsequently notified about the boundaries of the transmitted ULP SDU. ULP SDU extractor 1085, then, extracts the transmitted ULP SDU and delivers it to the upper layer.

Figure 11A:
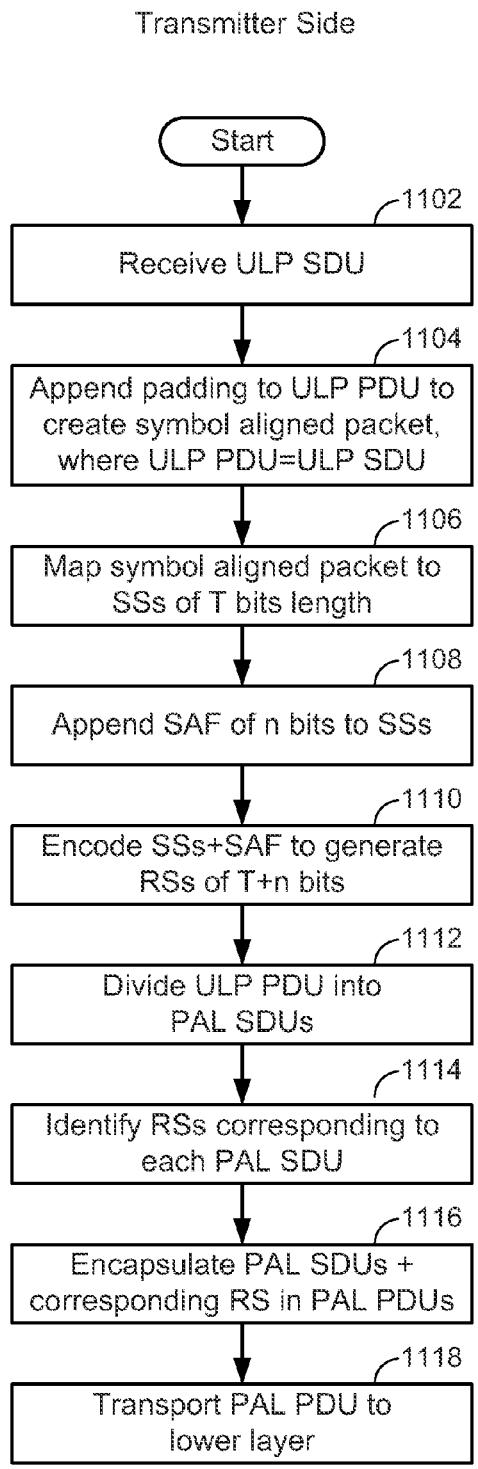
FIG. 11A is a flow diagram of packet transporting at a transmitter according to the exemplary embodiment of FIG. 8B.

FIG. 11A is a flow diagram of framing a packet for transporting at a transmitter according to the alternative exemplary embodiment of FIG. 8B. In step 1102, the transmitter's PAL module receives a ULP SDU. In this embodiment, the ULP PDU is equal to the ULP SDU since no length field is added. Thus, there is a saving of two bytes per ULP SDU. Then, in step 1104, appropriate padding, in the form of octets, is added, to create symbol aligned packet. The length of the symbol aligned packet must be an integer multiple of T, which is the symbol length. In step 1106, the symbol aligned packet is mapped to source symbols. In step 1108, a Symbol Auxiliary Field of n bits is appended to each SS. For example n may be 8 or 16. This field comprises a one bit "Start" indicator and an n-1 bit "PadPlusOne" indicator. For each SS, the "Start" bit of the Symbol Auxiliary Field is set to one if and only if the source symbol contains the beginning of a ULP SDU. The "PadPlusOne" bit contains the number of padding octets at the end of the SS, or zero if the SS does not contain the end of a ULP SDU. In step 1110, the augmented SSs are encoded to generate RSs of T+n size according to chord elastic codes described earlier in this application. For the SS encoder, augmented SSs of T+n bits are used, where the n bits correspond to the SAF field. The resulting repair symbol(s) are each then considered as a T bit ordinary repair symbol plus an n bit Repair Symbol Auxiliary field. In step 1112, the ULP SDU is segmented into PAL SDUs. In step 1116, each PAL SDU is encapsulated with corresponding RSs in PAL PDUs. Corresponding RSs comprise RSs that protect the SSs that were included in the previous PAL SDU, as described earlier with reference to FIG. 8. Then, in step 1118, each PAL PDU is delivered to a lower layer.

Figure 11B:
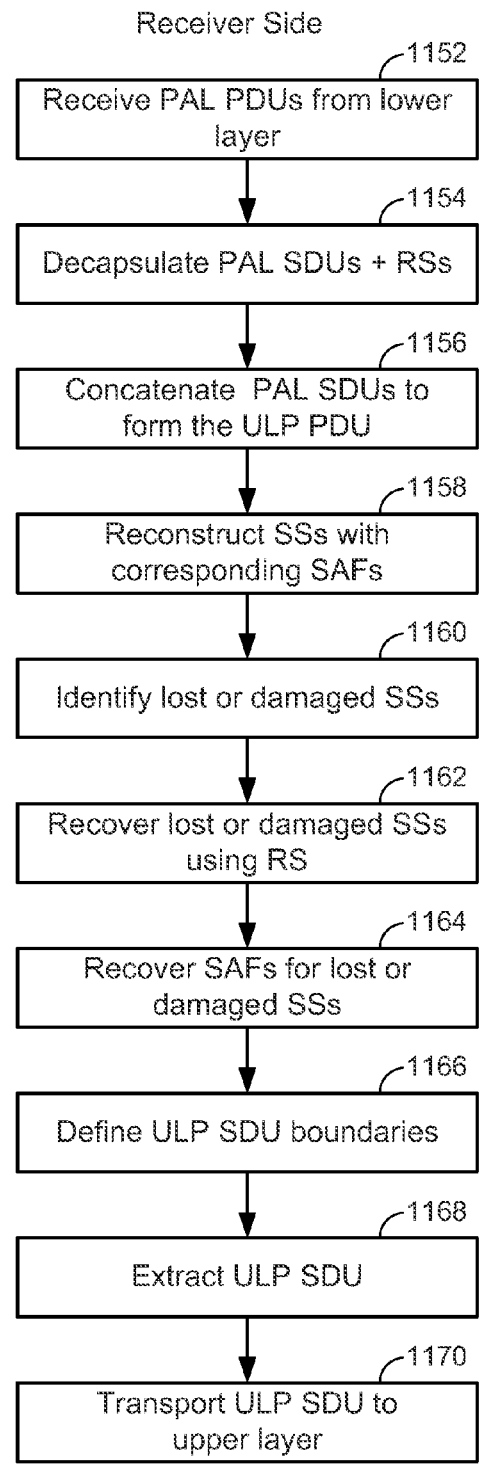
FIG. 11B is a flow diagram of packet transporting at a receiver according to the exemplary embodiment of FIG. 8B.

FIG. 11B is a flow diagram of packet transporting at a receiver according to the exemplary embodiment of FIG. 8B. In step 1152, the receiver's PAL module receives the PAL PDUs. In step 1154, the PAL SDUs and the corresponding RSs are decapsulated. Then, in step 1156, the PAL SDUs are concatenated to form a provisional ULP SDU. In step 1158, the SSs are reconstructed with their corresponding SAFs. Then, in step 1160 the lost or damaged SSs are identified. Using the RSs, the lost or damaged SSs are recovered in step 1162. Then, the SAFs for the lost or damaged SSs are recovered, in step 1164. This helps identify the boundaries of the transmitted ULP SDU in step 1166. Next, in step 1168, the transmitted ULP SDU is extracted. Finally, in step 1170, the ULP SDU is delivered to the upper layer.

Figure 12A:
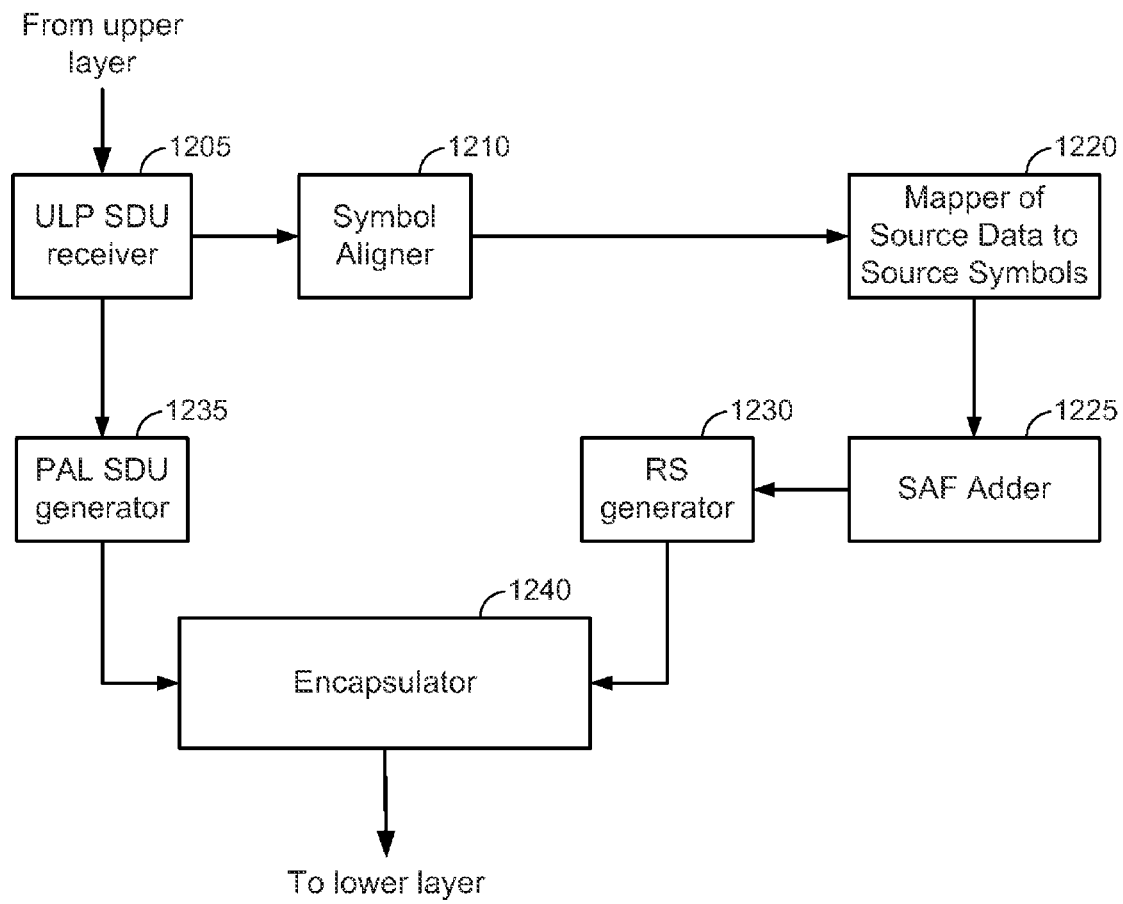
FIG. 12A is a block diagram of a transmitter PAL module according to the exemplary embodiment of FIG. 8B.

FIG. 12A is a block diagram of a transmitter PAL module according to the exemplary embodiment of FIG. 8B. Transmitter PAL module 1200 comprises ULP SDU receiver 1205 acting as an interface for receiving ULP SDUs from an upper layer. ULP SDU receiver 1205 forwards the ULP SDU to symbol aligner 1210 and to PAL SDU generator 1235. Symbol aligner 1210 adds appropriate padding to the ULP SDU to form a symbol aligned packet. The length of the symbol aligned packet, comprising ULP SDU and padding, must be a multiple of one symbol length. Then, symbol aligner 1210 forwards the symbol aligned packet to Mapper 1220 where the symbol aligned packet is mapped to source symbols of size T bits. An SAF adder 1225 augments the source symbols with a Symbol Auxilliary Field of size n bits. The SAF is used to indicate the boundaries of the ULP SDU. The new SSs of size T+n are fed to repair symbol generator 1230, where repair symbols of size T+n are generated based on chord elastic codes as described earlier. In parallel, PAL SDU generator 1235 receives ULP SDU (with no padding) and segments it to generate a plurality of PAL SDUs. In principle, the size of each PAL SDU must be such that only one PAL SDU is included in each physical layer packet. Each PAL SDU coming from PAL SDU generator 1235 and RS symbols coming from RS generator 1230 are fed to encapsulator 1240 where appropriate framing and flow headers are added as described with reference to FIG. 7. Encapsulator 1240 produces PAL PDUs that are subsequently delivered to lower layers for further framing and processing. It is noted that the RSs encapsulated with a PAL SDU protect, generally, source symbols that were encapsulated in the previous PAL PDU. However, if insufficient source data is available to fill a PAL PDU, and one or more repair symbols could be included in the same PAL PDU without reducing the amount of source data in that packet, then a repair symbol may be included in the same PAL PDU with the last source octet it protects. It is also noted that the RSs generated are of size T+n bits, where the T bits belong to an ordinary repair symbol and the n bits to a repair symbol auxiliary field (RSAF). The SAFs for the source symbols are not sent over the air. Instead, RSAFs are transmitted as part of the T+n bits RSs.

Figure 12B:
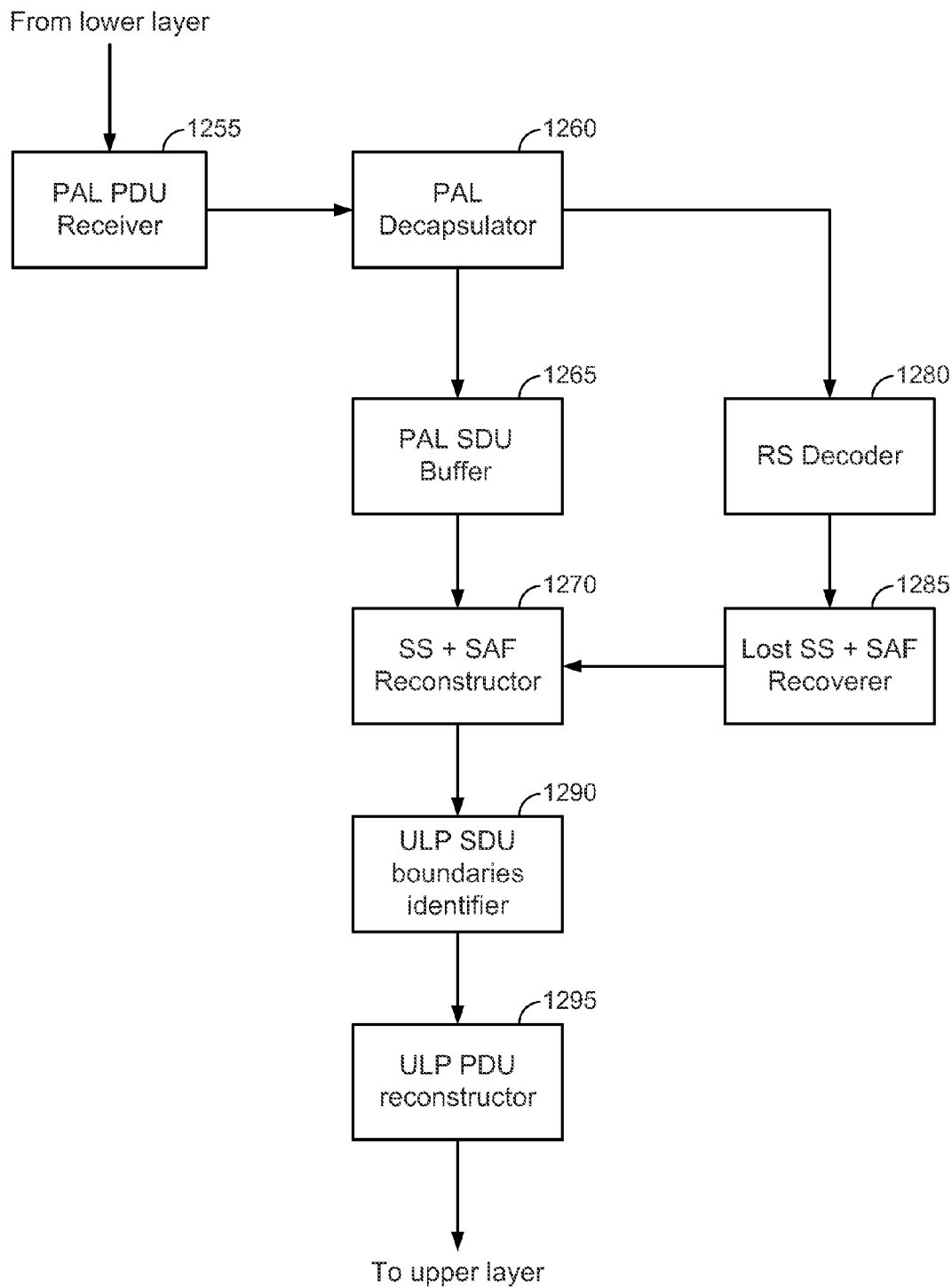
FIG. 12B is a block diagram of a receiver PAL module according to the exemplary embodiment of FIG. 8B.

FIG. 12B is a block diagram of a receiver PAL module according to the exemplary embodiment of FIG. 8B. PAL PDU receiver 1255 receives a PAL PDU from a lower level. Then, decapsulator 1260 decapsulates a PAL SDU and any corresponding RSs included in the PAL PDU. Each PAL SDU is fed to PAL SDU buffer 1265 and the RSs to RS decoder 1280. PAL SDU buffer 1270 concatenates all PAL SDUs corresponding to a provisional ULP SDU and the concatenated PAL SDUs are fed to SS and SAF reconstructor 1270 to reconstruct the received SSs and corresponding SAFs. Decoder 1280 receives the reconstructed SSs and SAFs, as well as the decapsulated RSs, decodes the RSs and recovers any lost SSs and corresponding SAF information. Source symbols from decoder 1280 are delivered to SS and SAF reconstructor 1270 to complete the reconstruction. The reconstructed or recovered SSs are fed to ULP SDU boundaries identifier where, using SAF information, the boundaries of the recovered ULP SDUs are identified. Then, ULP SDU extractor 1295 extracts the ULP SDU that is subsequently delivered to upper layers.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, in a transmitter, of framing an upper layer packet Service Data Unit (ULP SDU), comprising:
    adding (1108) a Symbol Auxilliary Field (SAF) (862) to at least one source symbol (858) to indicate the boundaries of the ULP SDU and the length of potential padding needed to symbol align the ULP SDU; and
    encapsulating (1116) a portion of the ULP SDU along with at least one RS to form a PAL PDU, where the RS is generated by encoding (1110) at least one of the SSs augmented with the SAF (859).

2. The method of claim 1, where the SAF comprises of a 1 bit start indicator, indicating the starting boundary of the ULP SDU, and an n-1 bit padding length indicator.

3. The method of claim 2, further comprising mapping (1106) the symbol aligned ULP SDU to the at least one source symbol.

4. The method of claim 3, further comprising appending (1104) padding to the ULP SDU to create the symbol aligned ULP SDU.

5. The method of claim 4, further comprising dividing (1112) the ULP SDU into portions so that the overall length of the encapsulated PAL PDU is appropriately sized to fit in one physical layer packet.

6. The method of claim 1, where the at least one RS is encapsulated in a PAL PDU subsequent to the PAL PDU containing the source data protected by the RS.

7. The method of claim 1, where the encapsulating further comprises adding (1117) framing and flow headers.

8. A transmitter PAL module for delivering a ULP SDU from an upper layer to a lower layer comprising:
    an SAF adder (1225), for indicating the boundaries of the ULP SDU by appending an SAF to each SS that includes at least a portion of the ULP SDU; and
    an encapsulator (1240), for encapsulating the at least one portion of the ULP SDU along with at least one RS generated from at least one SS augmented with the SAF.

9. The transmitter PAL module of claim 8, further comprising an RS generator (1230) for encoding the at least one SS augmented with the SAF.

10. A transporter for delivering a ULP SDU from an upper layer to a lower layer comprising:
    means (1225) for indicating the boundaries of the ULP SDU by appending an SAF to each SS; and
    means (1240) for encapsulating a portion of a ULP PDU along with at least one RS generated from at least one SS augmented with the SAF.

11. A computer program product for use with a processor device that frames an upper layer packet Service Data Unit (ULP SDU) for transporting to a lower layer for further processing and transmission over a communication link, the computer program product having instructions to cause the processor device to:
    add a Symbol Auxilliary Field to each source symbol to indicate the boundaries of the ULP SDU and the length of potential padding needed to symbol align the ULP SDU; and
    encapsulate a portion of the ULP SDU along with at least one RS to form a PAL PDU, where the RS is generated by encoding at least one of the SSs augmented with the SAF.

* * * * *